(12) United States Patent
Sinyavskiy et al.

(10) Patent No.: US 10,899,008 B2
(45) Date of Patent: Jan. 26, 2021

(54) SYSTEMS AND METHODS FOR ROBOTIC PATH PLANNING

(71) Applicant: BRAIN CORPORATION, San Diego, CA (US)

(72) Inventors: Oleg Sinyavskiy, San Diego, CA (US); Jean-Baptiste Passot, Solana Beach, CA (US); Borja Ibarz Gabardos, London (GB); Diana Vu Le, San Diego, CA (US)

(73) Assignee: Brain Corporation, San Diego, CA (US)

( * ) Notice: Subject to any disclaimer, the term of this patent is extended or adjusted under 35 U.S.C. 154(b) by 119 days.

(21) Appl. No.: 16/376,237

(22) Filed: Apr. 5, 2019

(65) Prior Publication Data

US 2019/0299410 A1    Oct. 3, 2019

Related U.S. Application Data

(63) Continuation of application No. 15/474,816, filed on Mar. 30, 2017, now Pat. No. 10,293,485.

(51) Int. Cl.
*B25J 9/16* (2006.01)
*B25J 11/00* (2006.01)
(Continued)

(52) U.S. Cl.
CPC .......... *B25J 9/1666* (2013.01); *A47L 11/283* (2013.01); *A47L 11/4008* (2013.01); *A47L 11/4011* (2013.01); *A47L 11/4061* (2013.01); *A47L 11/4066* (2013.01); *B25J 11/0085* (2013.01); *G01C 21/00* (2013.01); *G01C 21/32* (2013.01); *G01C 21/3407* (2013.01);
(Continued)

(58) Field of Classification Search
USPC .................................................. 700/245–264
See application file for complete search history.

(56) References Cited

U.S. PATENT DOCUMENTS 7,684,125 B2 *   3/2010   Bieg ........................ G21K 1/04
                                                         359/739
8,121,749 B1 *   2/2012   Agrawal ............... G06Q 10/047
                                                         701/23
(Continued)

OTHER PUBLICATIONS

U.S. Appl. No. 15/474,816, filed Mar. 30, 2017.

*Primary Examiner* — Jonathan L Sample
(74) *Attorney, Agent, or Firm* — Reed Smith LLP; Sidharth Kapoor

(57) ABSTRACT

Systems and methods for robotic path planning are disclosed. In some implementations of the present disclosure, a robot can generate a cost map associated with an environment of the robot. The cost map can comprise a plurality of pixels each corresponding to a location in the environment, where each pixel can have an associated cost. The robot can further generate a plurality of masks having projected path portions for the travel of the robot within the environment, where each mask comprises a plurality of mask pixels that correspond to locations in the environment. The robot can then determine a mask cost associated with each mask based at least in part on the cost map and select a mask based at least in part on the mask cost. Based on the projected path portions within the selected mask, the robot can navigate a space.

20 Claims, 18 Drawing Sheets

(51) Int. Cl.
  *G05D 1/02*   (2020.01)
  *A47L 11/283*   (2006.01)
  *A47L 11/40*   (2006.01)
  *G01C 21/00*   (2006.01)
  *G01C 21/32*   (2006.01)
  *G01C 21/34*   (2006.01)

(52) U.S. Cl.
  CPC ......... *G05D 1/0214* (2013.01); *G05D 1/0217* (2013.01); *G05D 1/0274* (2013.01); *G05D 2201/0203* (2013.01)

(56) References Cited

U.S. PATENT DOCUMENTS

| | | | | |
|---|---|---|---|---|
| 9,248,835 | B2* | 2/2016 | Tanzmeister | B60W 30/0956 |
| 9,258,550 | B1* | 2/2016 | Sieracki | H04N 13/282 |
| 9,323,250 | B2* | 4/2016 | Wang | G05D 1/0214 |
| 2004/0136438 | A1* | 7/2004 | Fullerton | H03C 1/02 |
| | | | | 375/130 |
| 2004/0218661 | A1* | 11/2004 | Jones | G01J 5/0003 |
| | | | | 374/137 |
| 2008/0059015 | A1* | 3/2008 | Whittaker | G08G 1/161 |
| | | | | 701/23 |
| 2012/0130538 | A1* | 5/2012 | Riener | G05B 19/423 |
| | | | | 700/245 |
| 2014/0100768 | A1* | 4/2014 | Kessens | G05D 1/0891 |
| | | | | 701/124 |
| 2014/0329172 | A1* | 11/2014 | Hart | G03H 1/20 |
| | | | | 430/2 |
| 2015/0219437 | A1* | 8/2015 | Dowski | G05D 1/0278 |
| | | | | 701/1 |
| 2016/0082597 | A1* | 3/2016 | Gorshechnikov | B25J 9/1697 |
| | | | | 700/253 |
| 2016/0148433 | A1* | 5/2016 | Petrovskaya | G02B 27/01 |
| | | | | 345/633 |
| 2017/0157769 | A1* | 6/2017 | Aghamohammadi | |
| | | | | G05D 1/0217 |
| 2017/0176994 | A1* | 6/2017 | Yedidia | G06N 5/02 |
| 2017/0176999 | A1* | 6/2017 | Bobda | G05D 1/0297 |
| 2017/0213070 | A1* | 7/2017 | Aghamohammadi | B25J 9/163 |
| 2017/0285648 | A1* | 10/2017 | Welty | G06Q 10/087 |
| 2017/0329347 | A1* | 11/2017 | Passot | G05D 1/0088 |
| 2018/0012370 | A1* | 1/2018 | Aghamohammadi | G06T 7/50 |

* cited by examiner

SYSTEMS AND METHODS FOR ROBOTIC PATH PLANNING

CROSS-REFERENCE AND RELATED APPLICATIONS

This application is a continuation of U.S. patent application Ser. No. 15/474,816, filed Mar. 30, 2017, and is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for robotic path-planning.

Background

Currently, some conventional mobile robots can be configured to go from one location to another, destination location. Such mobile robots can follow a set path and/or make adjustments along the set path while traveling to the destination location.

Some conventional mobile robots do not have a particular destination location. Rather, the mobile robots can perform a task in a space. For example, some household vacuums are designed to clean a space, but may not have a particular destination location.

However, in certain dynamic environments, it can be desirable for mobile robots to both perform a task in a space and travel from one location to a destination location. Conventional mobile robots can have trouble optimizing both behaviors. Accordingly, there is a need in the art for improved systems and methods for robotic path planning.

SUMMARY

The foregoing needs are satisfied by the present disclosure, which provides for, inter alia, systems and methods for robotic path planning. In some implementations, a robot can determine the cost and/or benefit of travelling a plurality of projected paths before selecting one that the robot will travel.

Example implementations described herein have innovative features, no single one of which is indispensable or solely responsible for their desirable attributes. Without limiting the scope of the claims, some of the advantageous features will now be summarized.

In a first aspect, a method for path planning by a robot is disclosed. In one exemplary implementation, the method includes: generating a cost map associated with an environment of the robot, the cost map comprising a plurality of cost map pixels, each cost map pixel of the plurality corresponding to a respective location in the environment and each cost map pixel of the plurality having an associated cost; generating a plurality of masks, each mask of the plurality having projected path portions for the travel of the robot within the environment, each mask of the plurality comprising a plurality of mask pixels, wherein each mask pixel of the plurality corresponds to a location in the environment; determining if a recovery condition applies based at least in part on the position of the robot relative to one or more obstacles in the environment, and, if the recovery condition applies, modifying at least one of (1) the cost map and/or (2) one or more of the plurality of masks; determining a mask cost associated with each mask of the plurality based at least in part on the generated cost map; selecting a first mask of the plurality of masks based at least in part on the determined mask cost of the first mask; determining actuator commands for the robot to travel the projected path portions included in the first mask; and actuating an actuator of the robot based at least in part on the determined actuator commands.

In one variant, determining the mask cost further comprises: forming at least one matrix comprising one or more masks; and taking a dot product between the at least one matrix and the generated cost map.

In another variant, the method further comprising rotating the cost map and each mask so that the cost map and each mask are orientated substantially similarly relative to the robot. In another variant, the rotating causes the generated cost map and each mask of the plurality of masks to be robot centric.

In another variant, the method further comprises generating a second cost map comprising a plurality of second cost map pixels, wherein each second cost map pixel corresponds to a respective location in the environment and each second cost map pixel of the plurality includes a vector indicative at least in part of an orientation of the robot for the shortest path from a present location of the robot and the respective location associated with each second cost map pixel.

In another variant, determining the mask cost associated with each mask of the plurality of masks is further based at least in part on the generated second cost map. In another variant, the recovery condition includes determining a motion restriction on the robot based at least in part on a presence of an obstacle. In another variant, the method further comprises implementing a cost penalty each time the first mask is selected, wherein the implemented cost penalty makes it less likely that the first mask will be selected again.

In another variant, a path portion of the projected path portions comprises a trajectory of the robot over time. In another variant, the path portion of the projected path portions comprises a cleaning path of the robot.

In another exemplary implementation, the method for path planning by a robot comprises: generating a cost map associated with an environment of the robot, the cost map comprising a plurality of cost map pixels, each cost map pixel of the plurality corresponding to a location in the environment and each cost map pixel of the plurality having an associated cost based at least in part on a desire to clean the respective location; generating a plurality of masks having projected trajectories for the travel from the pose of the robot within the environment, each mask of the plurality comprising a plurality of mask pixels, wherein each mask pixel of the plurality corresponds to a respective location in the environment for which the robot will clean should the robot select the mask; determining a mask cost associated with each mask based at least in part on the generated cost map; and selecting a first mask of the plurality of masks based at least in part on the mask cost of the first mask.

In a one variant, the method comprises actuating one or more actuators of the robot to clean a first projected trajectory included in the first mask. In another variant, the method further comprises adjusting the generated cost map in response to user feedback.

In another variant, generating the plurality of masks further comprises: receiving a footprint of the robot; and generating the plurality of masks based at least in part on an avoidance of collisions between obstacles in the environment and the received footprint of the robot.

In another variant, generating the plurality of masks further comprises: receiving one or more physical attributes of the robot, the one or more physical attributes restricting an ability of the robot to maneuver; and generating the plurality of masks based at least in part on the received one or more physical attributes.

In a second aspect, a robot is disclosed. In one exemplary implementation, the robot comprises: one or more sensors configured to generate sensor data about an environment of the robot; one or more actuators configured to propel travel of the robot; a processor apparatus configured to: generate a map of the environment based at least in part on the sensor data generated by the one or more sensors; generate a cost map associated with at least a portion of the generated map of the environment, the generated cost map comprising a plurality of cost map pixels wherein each cost map pixel of the plurality corresponds to a respective location in the environment and each cost map pixel of the plurality has an associated cost; generate a plurality of masks, each mask of the plurality having projected path portions for the travel of the robot within the environment, each mask of the plurality comprising a plurality of mask pixels wherein each mask pixel of the plurality corresponds to a respective location in the environment; determine if a recovery condition applies based at least in part on the position of the robot relative to one or more obstacles in the environment, and, if the recovery condition applies, modifying at least one of (1) the cost map and/or (2) one or more of the plurality of masks; determine a mask cost associated with at least one mask of the plurality based at least in part on the generated cost map; select a first mask of the plurality of masks based at least in part on the mask cost of the first mask; and actuate the one or more actuators based at least in part on the first mask.

In one variant, the robot further comprises one or more brush actuators that are configured to operate a cleaning brush of the robot. In another variant, the processor apparatus is further configured to actuate the one or more brush actuators based at least in part on the generated cost map. In another variant, the processor apparatus is further configured to update the mask cost associated with each mask of the plurality based at least in part on the robot encountering an obstacle in the environment. In another variant, the processor apparatus is further configured to implement a learning process that identifies one or more recovery conditions.

In another exemplary implementation, the robot comprises: one or more sensors configured to generate sensor data about an environment of the robot; one or more actuators configured to propel travel of the robot; a mapping unit configured to generate a map of the environment based at least in part on the sensor data generated by the one or more sensors; generate a cost map associated with at least a portion of the generated map of the environment, the generated cost map comprising a plurality of cost map pixels wherein each cost map pixel of the plurality corresponds to a respective location in the environment and each cost map pixel of the plurality has an associated cost; generate a plurality of masks, each mask of the plurality having projected path portions for the travel of the robot within the environment, each mask of the plurality comprising a plurality of mask pixels wherein each mask pixel of the plurality corresponds to a respective location in the environment; determine if a recovery condition applies based at least in part on the position of the robot relative to one or more obstacles in the environment, and, if the recovery condition applies, modifying at least one of (1) the cost map and/or (2) one or more of the plurality of masks; determine a mask cost associated with at least one mask of the plurality based at least in part on the generated cost map; and select a first mask of the plurality of masks based at least in part on the mask cost of the first mask; wherein: the one or more actuators actuate based at least in part on the first mask.

In another exemplary implementation, the robot comprises: means for generating a map of an environment of the robot based at least in part on data; means for propelling travel of the robot; means for generating a cost map associated with at least a portion of the generated map of the environment, the generated cost map comprising a plurality of cost map pixels wherein each cost map pixel of the plurality corresponds to a respective location in the environment and each cost map pixel of the plurality has an associated cost; means for generating a plurality of masks, each mask of the plurality having projected path portions for the travel of the robot within the environment, each mask of the plurality comprising a plurality of mask pixels wherein each mask pixel of the plurality corresponds to a respective location in the environment; means for determining if a recovery condition applies based at least in part on a position of the robot relative to one or more obstacles in the environment, and, if the recovery condition applies, modifying at least one of (1) the cost map and/or (2) one or more of the plurality of masks; means for determining a mask cost associated with each mask of the plurality based at least in part on the generated cost map; means for selecting a first mask of the plurality of masks based at least in part on the mask cost of the first mask; and means for actuating the means for propelling travel of the robot based at least in part on the first mask.

In a third aspect, a method for manufacturing a robot is disclosed. In one exemplary implementation, the method for manufacturing comprises: attaching a module comprising a processor and one or more sensors; configuring the one or more sensors to generate a map of an environment of the robot; configuring the processor to: generate a cost map associated with an environment of the robot, the cost map comprising a plurality of cost map pixels each corresponding to a location in the environment and each cost map pixel having an associated cost based at least in part on a desire to clean the location; generate a plurality of masks having projected trajectories for the travel from the pose of the robot within the environment, each mask comprising a plurality of mask pixels wherein each mask pixel corresponds to a location in the environment for which the robot will clean should the robot select the mask; determine a mask cost associated with each mask based at least in part on the cost map; and selecting a first mask based at least in part on the mask cost of the first mask.

In a fourth aspect, a non-transitory computer-readable storage apparatus is disclosed. In one exemplary implementation, the non-transitory computer-readable storage apparatus has a plurality of instructions stored thereon, the instructions being executable by a processing apparatus to operate a robot. The instructions configured to, when executed by the processing apparatus, cause the processing apparatus to: generate a cost map associated with an environment of the robot, the cost map comprising a plurality of cost map pixels each corresponding to a location in the environment and each cost map pixel having an associated cost; generate a plurality of masks having projected path portions for the travel of the robot within the environment, each mask comprising a plurality of mask pixels wherein each mask pixel corresponds to a location in the environment; determine if a recovery condition applies based at least in part on the position of the robot relative to one or more obstacles in the environment, and, if the recovery condition applies, modifying at least one of (1) the cost map and (2) one or more of the plurality of masks; determine a mask cost associated with each mask based at least in part on the cost map; select a first mask based at least in part on the mask cost of the first mask; determine actuator commands for the robot to travel the projected path portions included in the first mask; and actuate an actuator of the robot based at least in part on the actuator commands.

In another exemplary implementation, the non-transitory computer-readable storage apparatus has a plurality of instructions stored thereon, the instructions being executable by a processing apparatus to operate a robot. The instructions configured to, when executed by the processing apparatus, cause the processing apparatus to: generate a cost map associated with an environment of the robot, the cost map comprising a plurality of cost map pixels each corresponding to a location in the environment and each cost map pixel having an associated cost based at least in part on a desire to clean the location; generate a plurality of masks having projected trajectories for the travel from the pose of the robot within the environment, each mask comprising a plurality of mask pixels wherein each mask pixel corresponds to a location in the environment for which the robot will clean should the robot select the mask; determine a mask cost associated with each mask based at least in part on the cost map; and select a first mask based at least in part on the mask cost of the first mask.

In a fifth aspect, a system for planning the path of a robot is disclosed. In one exemplary implementation, the system includes: a robot comprising one or more sensors configured to generate sensor data about an environment of the robot; a network communicatively coupled to the robot, the network configured to: generate a cost map associated with at least a portion of the generated map of the environment, the generated cost map comprising a plurality of cost map pixels wherein each cost map pixel of the plurality corresponds to a respective location in the environment and each cost map pixel of the plurality has an associated cost; and an access point configured to provide user input through a user interface; wherein: the network further generates the cost map based on the user input.

In one variant, generation of the cost map utilizes a machine learning process.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
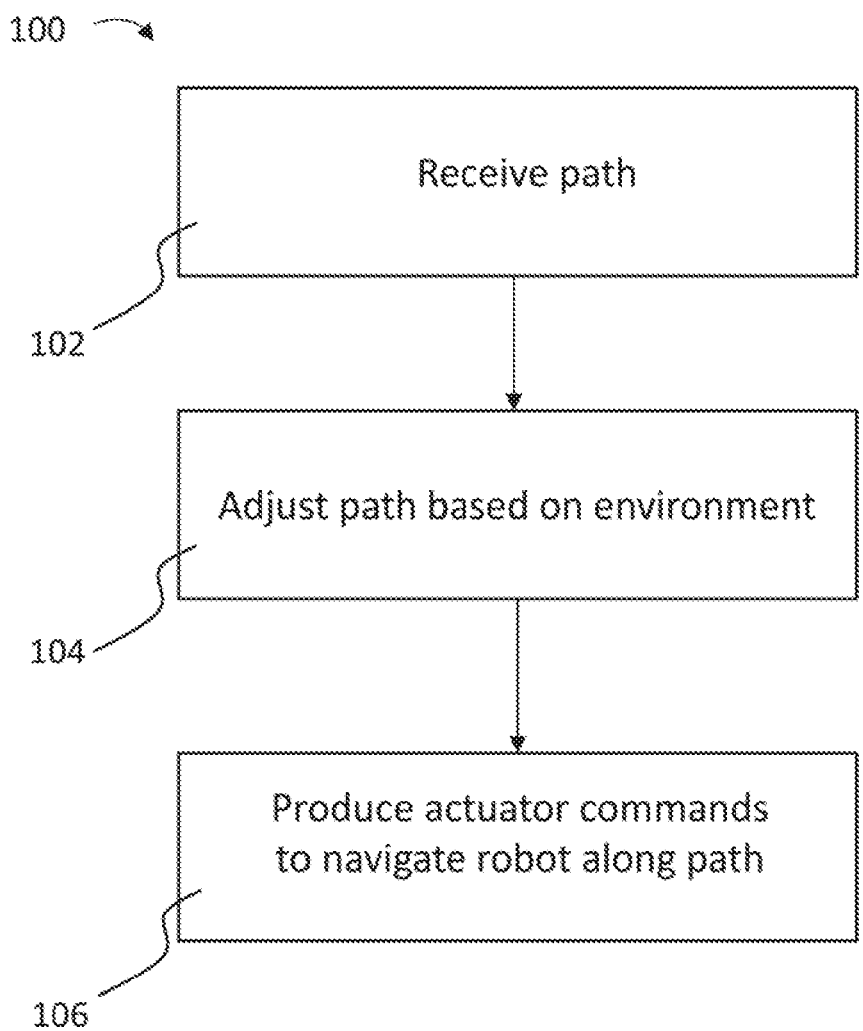
FIG. 1A is a process flow diagram of an exemplary method for navigating a robot in accordance with some implementations of this disclosure.

All Figures disclosed herein are © Copyright 2017 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved mobile platforms. In particular, some implementations of the present disclosure relate to robots, such as robotic mobile platforms. As used herein, a robot can include mechanical and/or virtual entities configured to carry out a complex series of actions automatically. In some cases, robots can be machines that are guided and/or instructed by computer programs and/or electronic circuitry. In some cases, robots can include electro-mechanical components that are configured for navigation, where the robot can move from one location to another. Such robots can include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, wheelchairs, etc.), stocking machines, trailer movers, vehicles, and the like. Robots can also include any autonomous and/or semi-autonomous machine for transporting items, people, animals, cargo, freight, objects, luggage, and/or anything desirable from one location to another. In some cases, such robots used for transportation can include robotic mobile platforms as the robots are mobile systems that can navigate and/or move autonomously and/or semi-autonomously. These robotic mobile platforms can include autonomous and/or semi-autonomous wheelchairs, bikes, row boats, scooters, forklifts, trams, trains, carts, vehicles, tugs, and/or any machine used for transportation.

As referred to herein, floor cleaners can include floor cleaners that are manually controlled (e.g., driven or remote controlled) and/or autonomous (e.g., using little to no user control). For example, floor cleaners can include floor scrubbers that a janitor, custodian, or other person operates and/or robotic floor scrubbers that autonomously navigate and/or clean an environment. Similarly, floor cleaners can also include vacuums, steamers, buffers, mops, polishers, sweepers, burnishers, etc.

Certain examples are described herein with reference to floor cleaners or mobile platforms, or robotic floor cleaners or robotic mobile platforms. Such examples are used for illustration only, and the principles described herein may be readily applied to robots generally.

In some cases, robots can include appliances, machines, and/or equipment automated to perform one or more tasks. For example, a module can be attached to the appliances, machines, and/or equipment to allow them to operate autonomously. Such attaching can be done by an end user and/or as part of the manufacturing process. In some implementations, the module can include a motor that drives the autonomous motions of the appliances, machines, and/or equipment. In some cases, the module causes the appliances, machines, and/or equipment to operate based at least in part on spoofing, such as by sending control signals to pre-existing controllers, actuators, units, and/or components of the appliances, machines, and/or equipment. The module can include sensors and/or processors to receive and generate data. The module can also include processors, actuators, and/or any of the components described herein to process the sensor data, send control signals, and/or otherwise control pre-existing controllers, units, and/or components of the appliances, machines, and/or equipment. Such appliances, machines, and/or equipment can include cars, floor cleaners, rovers, drones, planes, boats, carts, trams, wheelchairs, industrial equipment, stocking machines, mobile platforms, personal transportation devices, stocking machines, trailer movers, vehicles, and/or any type of machine.

Detailed descriptions of the various implementations and variants of the system and methods of the disclosure are now provided. While many examples discussed herein may refer to robotic floor cleaners, it will be appreciated that the described systems and methods contained herein are applicable to any kind of robot. Myriad other example implementations or uses for the technology described herein would be readily envisaged by those having ordinary skill in the art, given the contents of the present disclosure.

Advantageously, the systems and methods of this disclosure at least: (i) allow robots to safely operate in environments; (ii) provide comfort (e.g., by humans and/or animals) with robots by allowing robots to exhibit behaviors that appear natural; (iii) allow non-symmetric and/or non-circular robots to navigate; (iv) provide for computationally efficient management of robot resources; (v) improve the efficiency of robots; and (vi) allow robots to navigate and perform tasks. Other advantages are readily discernable by one having ordinary skill in the art given the contents of the present disclosure.

For example, in some implementations, a robot can comprise a floor cleaner. The floor cleaner can perform the task of cleaning a floor. Accordingly, the floor cleaner can clean a portion of a floor area. In some cases, there can be some portions that an operator desires to clean and some areas in which an operator does not desire to clean. For example, the floor cleaner can be a hard floor scrubber. An operator would desire for the hard floor scrubber to clean hard surfaces (e.g., tile, concrete, terrazzo, ceramic, and/or other hard surfaces), but not soft surfaces (e.g., carpet, artificial grass or turf, mats, and/or other soft surfaces). Moreover, where the robot is a floor cleaner, the operator can desire for the whole cleanable space to be cleaned. Moreover, the operator can desire for the floor cleaner to get close to walls and/or other objects. For example, not traversing a portion of the floor can lead to that portion not being cleaned. As another example, it can be desirable for a floor cleaner to get close to a wall without colliding with it, for example, it can be desirable for a floor cleaner to operate a predefined distance from a wall, such as approximately 1, 2, 3, 4, 5, 6, or more centimeters away. Additionally, the operator can also desire for the robot to avoid collisions in the space and/or navigate to a particular destination. Other non-cleaning robots can have similar desirable characteristics. For example, it can be desirable for a stocking robot to stock certain items at certain locations. It can be desirable for a mobile platform that transports people, items, animals, etc. to pick-up and/or drop-off items at certain locations. There are myriad other applications where it is desirable for a robot to perform a task at certain places (and not other places) while simultaneously navigate. Advantageously, systems and methods disclosed herein allow a robot to navigate a space (and not navigate others), avoid obstacles, perform a desired task, and/or go to a destination. Many current robots do not have this ability because of difficulties in optimizing a plurality of behaviors of the robot.

As another example, a challenge in robotic navigation is dealing with exceptions to general rules. In some cases, these can be called corner cases, where the robot can encounter atypical scenarios. Advantageously, systems and methods described in this disclosure can enable robots to deal with such exceptional cases.

As another example, conventional robots are often symmetrical, circular, turn in a tight radius, move in any direction, and/or maneuver without high dependency on the shape of the robots. However, many conventional machines are non-circular, non-symmetrical, cannot turn in a tight radius, cannot move in any direction, and/or maneuver with high dependency on shape. For example, a circular machine can turn and/or move in any direction. A machine that has a tricycle shape may require additional maneuvers to be able to turn and/or move in a direction. By way of illustration, where the tricycle shape robot has turned in a direction (e.g., left or right), it can take more movements to turn from that direction to another direction. Advantageously, systems and methods of this disclosure allow for conventional machines of many shapes to be robotized.

As another example, conventional robots can have software and hardware that do not allow for robust planning. Many conventional systems and methods used for planning utilize hardware that would be prohibitively costly and/or large in size. As a result, such conventional systems and methods may not be integrated readily into robots and/or robotic systems. Advantageously, systems and methods of this disclosure enable efficient use of hardware and/or software for robotic path planning.

FIG. 1A is a process flow diagram of an exemplary method 100 for navigating a robot in accordance with some implementations of this disclosure. Block 102 includes receiving a path. For example, the path can be learned by a robot, such as through demonstration or other learning processes. As another example, the path can be uploaded onto a robot, such as through a map, coordinates, images, and/or other data forms.

In some cases, the path can include a route for travelling. For example, the route can include translation of a robot from a first location to a second location. The route can include a plurality of positions, orientations, and/or poses of a robot, such as a plurality of positions, orientations, and/or poses associated with locations in an environment. In some cases, the route can include a linear path where a robot travels directly from a first location to a second location. In some implementations, the path can be more complex, including winding, double-backing, overlapping, u-turning, and/or other maneuvering in an environment as the robot translates. For example, such maneuvering can allow the robot to complete a task. By way of illustration, where the robot is a floor cleaner, the maneuvering can allow the robot to clean areas of a floor. As another example, where the robot is transporting items, people, animals, cargo, freight, objects, luggage, and/or anything desirable from one location to another, such maneuvering can allow the robot to go to different locations for pick-up, drop-off, site seeing, avoiding obstacles, and/or any other reason.

Block 104 includes adjusting the path received in block 102 based on the environment. In some cases, the received path in block 100 can be indicative at least in part of a path at a point in time. For example, where the robot is trained through demonstration, the path can be indicative of the route demonstrated at a particular time. The environment can have certain characteristics at the particular time, wherein the characteristics can change at another time. For example, the environment can be dynamic, including one or more objects and/or obstacles. At a first time, a segment of the environment can be clear. In some implementations, block 104 can include dynamic planning where the path of robot 200 can change with an environment in real time.

Figure 1B:
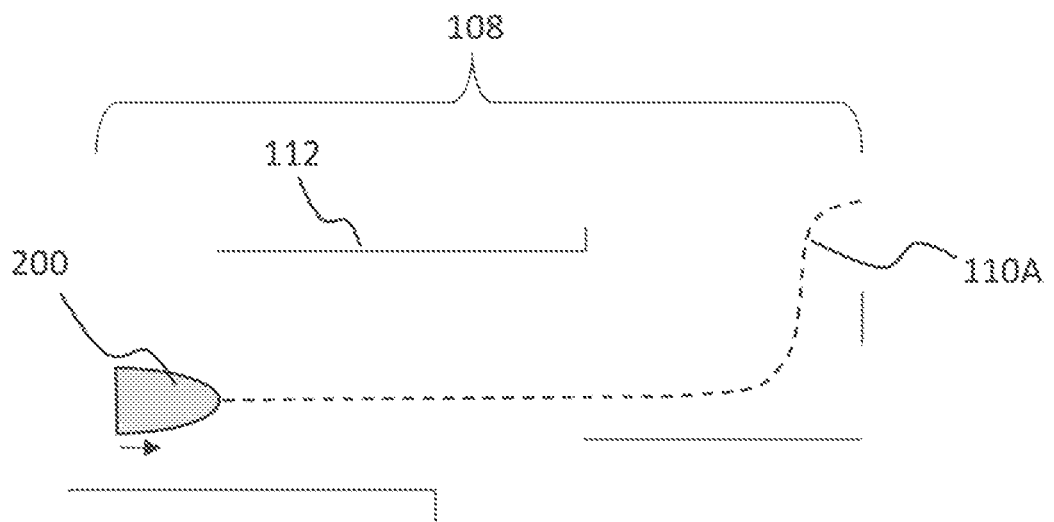
FIG. 1B is an overhead view of a robot travelling along a path in a section of an environment in accordance with some implementations of this disclosure.

For example, FIG. 1B is an overhead view of robot 200 travelling along a path in section 108 of an environment in accordance with some implementations of this disclosure. Section 108 can be a portion in which robot 200 traverses in an environment. In section 108, robot 200 can travel along path portion 110A. Path portion 110A can be a portion of the path received in block 102. As illustrated, path portion 100 navigates around walls, such as wall 112, avoiding running into those walls. Because path portion 110A avoids the walls, robot 200, while travelling along path portion 110A, can avoid running into walls.

In some implementations, in addition to walls, such as wall 112, there can be objects and/or obstacles. It can be desirable for robot 200 to avoid such objects and/or obstacles as robot 200 travels in order to avoid collisions. Accordingly, path portion 110A can be influenced by the presence of environmental conditions, such as objects and/or obstacles.

Figure 1C:
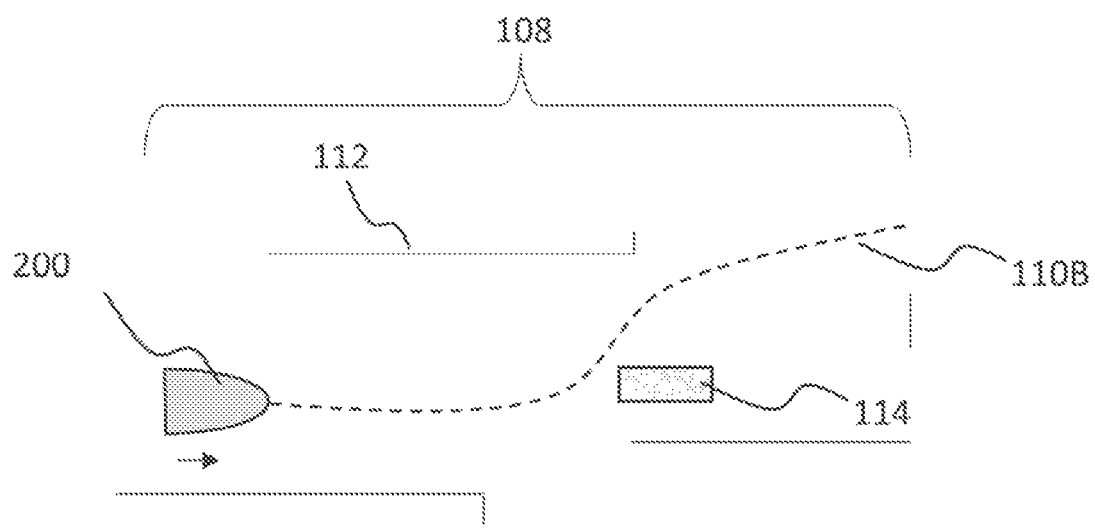
FIG. 1C is an overhead view of a robot travelling along an altered path portion in accordance to some implementations of this disclosure.

By way of illustration, FIG. 1C is an overhead view of robot 200 travelling along an altered path portion 110B in section 108 in accordance to some implementations of this disclosure. Object 114 can be in the way of robot 200 travelling on path portion 110A as illustrated in FIG. 1B. Accordingly, if robot 200 travelled along path portion 110A, it can collide and/or be impeded with object 114. Accordingly, in accordance to block 104, robot 200 can adjust section 108 to path portion 110B in order to go around object 114. While FIGS. 1B and 1C illustrate one adjustment, there can be any number of adjustments within section 108 and/or in other sections of a path in an environment.

How robot 200 plans around object 114 and/or plans the traversal of section 108 is a current challenge in the art. There can be a myriad of possible maneuvers that robot 200 can take. Moreover, robot 200 can have a plurality of objectives in actions, such as navigating a space, performing a robotic task (e.g., cleaning, transporting, and/or any other task robot 200 is configured to perform), performing a task as fast as possible, conserving energy and avoiding resource expensive maneuvers, preserving safe distances from obstacles, and/or other objectives. Advantageously, systems and methods of this disclosure can enable robot 200 to effectively and/or efficiently plan paths through spaces under conditions where there is a plurality of objectives.

Returning to FIG. 1A, block 106 can include producing actuator commands to navigate robot 200 along a path. By way of illustration, robot 200 can include actuators, such as actuators that propel robot 200 forward, turn robot 200, and/or actuate portions of robot 200. For robot 200 to travel along a path (e.g., path portion 110A or 110B), robot 200 can perform a series of actuations. The series of actuations (e.g., of actuators) can be responsive to a series of commands, such as command signals indicative at least in part of how the actuators actuate. In some cases, these commands can be actuator commands and/or motor commands (e.g., where the actuator is a motor). In some cases, such commands can be primitives, such as motor primitives and/or actuator primitives. In order to coordinate movements, commands can be supplied to one or more degree-of-freedom ("DOF") of the robot 200. These actuator commands allow robot 200 to form a trajectory that follows at least portions of a path, such as path portion 110A or 110B.

Figure 2:
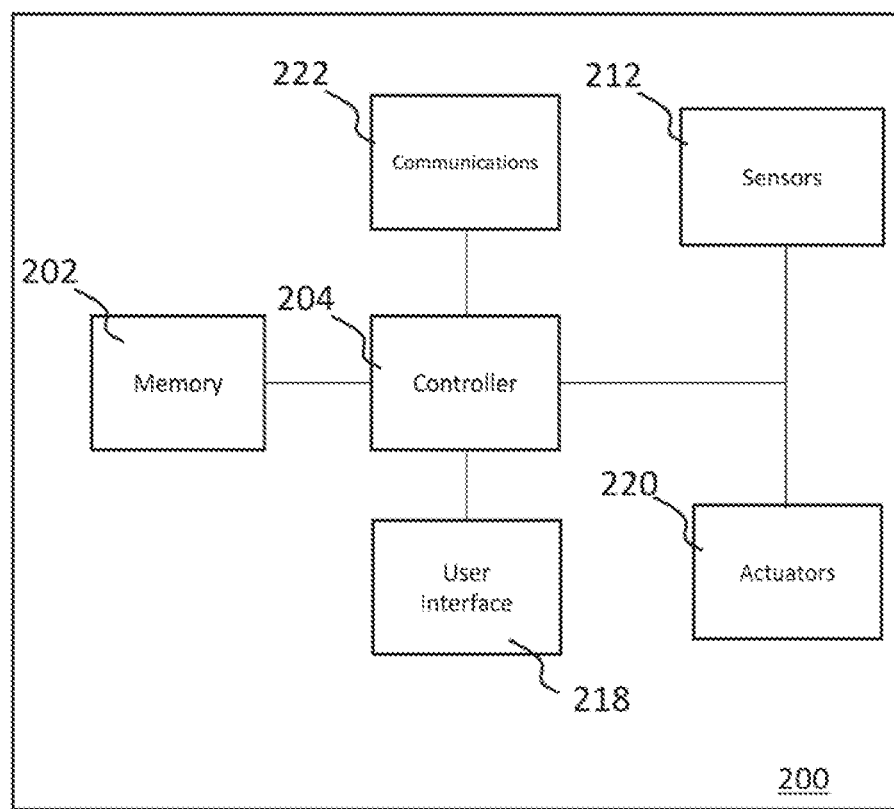
FIG. 2 is a functional block diagram of a robot in accordance with some principles of this disclosure.

FIG. 2 is a functional block diagram of a robot 200 in accordance with some principles of this disclosure. As illustrated in FIG. 2, robot 200 can include controller 204, memory 202, user interface unit 218, sensors unit 212, actuators unit 220, and communications unit 222, as well as other components and subcomponents (e.g., some of which may not be illustrated). Although a specific implementation is illustrated in FIG. 2, it is appreciated that the architecture can be varied in certain implementations as would be readily apparent to one of ordinary skill given the contents of the present disclosure. As used herein, robot 200 can be representative at least in part of any robot described in this disclosure. Robot 200 can instantiate one or more of the systems and methods described in this disclosure, such as method 100.

Controller 204 can control the various operations performed by robot 200. Controller 204 can include one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors can be contained on a single unitary integrated circuit die, or distributed across multiple components.

Controller 204 can be operatively and/or communicatively coupled to memory 202. Memory 202 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 202 can provide instructions and data to controller 204. For example, memory 202 can be a non-transitory, computer-readable storage apparatus and/or medium having a plurality of instructions stored thereon, the instructions being executable by a processing apparatus (e.g., controller 204) to operate robot 200. In some cases, the instructions can be configured to, when executed by the processing apparatus, cause the processing apparatus to perform the various methods, features, and/or functionality described in this disclosure. Accordingly, controller 204 can perform logical and/or arithmetic operations based on program instructions stored within memory 202. In some cases, the instructions and/or data of memory 202 can be stored in a combination of hardware, some located locally within robot 200, and some located remote from robot 200 (e.g., in a cloud, server, network, etc.).

In some implementations, sensors unit 212 can comprise systems and/or methods that can detect characteristics within and/or around robot 200. Sensors unit 212 can comprise a plurality and/or a combination of sensors. Sensors unit 212 can include sensors that are internal to robot 200 or external, and/or have components that are partially internal and/or partially external. In some cases, sensors unit 212 can include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. In some implementations, sensors unit 212 can collect raw measurements (e.g., currents, voltages, resistances, gate logic, etc.) and/or transformed measurements (e.g., distances, angles, detected points in obstacles, etc.). In some cases, measurements can be aggregated and/or summarized. Sensors unit 212 can generate data based at least in part on measurements. Such data can be stored in data structures, such as matrices, arrays, queues, lists, arrays, stacks, bags, etc. In some implementations, the data structure of the sensor data can be called an image.

In some implementations, sensors unit 212 can include sensors that can measure internal characteristics of robot 200. For example, sensors unit 212 can measure temperature, power levels, statuses, and/or any characteristic of robot 200. In some cases, sensors unit 212 can be configured to determine the odometry of robot 200. For example, sensors unit 212 can include proprioceptive sensors, which can comprise sensors such as accelerometers, inertial measurement units ("IMU"), odometers, gyroscopes, speedometers, cameras (e.g. using visual odometry), clock/timer, and the like. Odometry can facilitate autonomous navigation and/or autonomous actions of robot 200. This odometry can include position of robot 200 (e.g., where position can include robot's location, displacement and/or orientation, and can sometimes be interchangeable with the term pose as used herein) relative to the initial location. Such data can be stored in data structures, such as matrices, arrays, queues, lists, arrays, stacks, bags, etc. In some implementations, the data structure of the sensor data can be called an image.

In some implementations, controller 204 can include a mapping and/or localization unit that can receive sensor data from sensors unit 212 to localize robot 200 in a map. In some implementations, mapping and/or localization unit can include localization systems and methods that allow robot 200 to localize itself in the coordinates of a map and/or relative to a location (e.g., an initialization location, end location, beacon, reference point, etc.). The mapping and/or localization unit can also process measurements taken by robot 200, such as by generating a graph and/or map. The mapping and/or localization unit can also be a separate unit from the controller.

In some implementations, robot 200 can map and learn routes through a learning process. For example, an operator can teach robot 200 where to travel in an environment by driving robot 200 along a route in an environment. Through a combination of sensor data from sensor units 212, robot 200 can determine the relative poses of robot 200 and the poses of items in the environment. In this way, robot 200 can determine where it is in an environment and where it has travelled. Robot 200 can later recall where it travelled and travel in a substantially similar way (though it may avoid certain obstacles in subsequent travels). Robots can share such experiences with each other, such as through network 302 (which will be described with reference to FIG. 3). In some implementations, the mapping and localization unit can be used to carry forth method 100, including but not limited to receiving and/or determining a path, making adjustments to the path, and determining actuator commands.

In some implementations, user interface unit 218 can be configured to enable a user to interact with robot 200. For example, user interface unit 218 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users can interact through voice commands or gestures. User interface units 218 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In some implementations user interface unit 218 can be positioned on the body of robot 200. In some implementations, user interface unit 218 can be positioned away from the body of robot 200, but can be communicatively coupled to robot 200 (e.g., via communication units including transmitters, receivers, and/or transceivers) directly or indirectly (e.g., through a network, server, and/or a cloud). In some implementations, user interface unit 218 can include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information can utilize arrows, colors, symbols, etc.

In some implementations, communications unit 222 can include one or more receivers, transmitters, and/or transceivers. Communications unit 222 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 222 can also be configured to send/receive signals utilizing a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communications unit 222 to communicate to external systems, such as computers, smart phones, tablets, data capture systems, mobile telecommunications networks, clouds, servers, or the like. Communications unit 222 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 222 can be configured to send and receive statuses, commands, and other data/information. For example, communications unit 222 can communicate with a user operator to allow the user to control robot 200. Communications unit 222 can communicate with a server/network (e.g., a network) in order to allow robot 200 to send data, statuses, commands, and other communications to the server. The server can also be communicatively coupled to computer(s) and/or device(s) that can be used to monitor and/or control robot 200 remotely. Communications unit 222 can also receive updates (e.g., firmware or data updates), data, statuses, commands, and/or other communications from a server for robot 200.

Actuators unit 220 can include any system used for actuating, in some cases to perform tasks. For example, actuators unit 220 can include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. In some implementations, actuators unit 220 can include systems that allow movement of robot 200, such as motorized propulsion. For example, motorized propulsion can move robot 200 in a forward or backward direction, and/or be used at least in part in turning robot 200 (e.g., left, right, and/or any other direction). By way of illustration, actuators unit 220 can control if robot 200 is moving or is stopped and/or allow robot 200 to navigate from one location to another location.

One or more of the units described with respect to FIG. 2 (including memory 202, controller 204, sensors unit 212, user interface unit 218, actuators unit 220, communications unit 222, and/or other units) can be integrated onto robot 200, such as in an integrated system. However, in some implementations, one or more of these units can be part of an attachable module. This module can be attached to an existing apparatus to automate so that it behaves as a robot. Accordingly, the features described in this disclosure with reference to robot 200 can be instantiated in a module that can be attached to an existing apparatus and/or integrated onto robot 200 in an integrated system. Moreover, in some cases, a person having ordinary skill in the art would appreciate from the contents of this disclosure that at least a portion of the features described in this disclosure can also be run remotely, such as in a cloud, network, and/or server.

Figure 3:
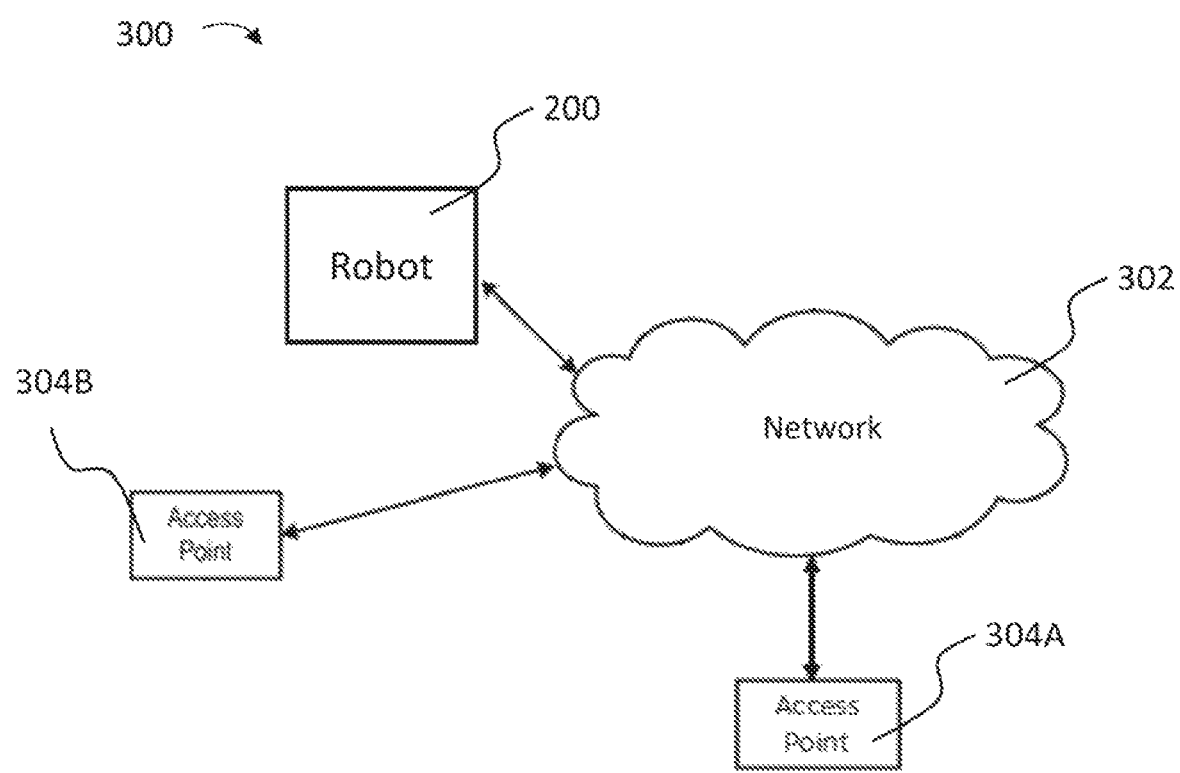
FIG. 3 is a functional block diagram of a system, which includes a robot communicatively and/or operatively coupled to a network in accordance with some implementations of this disclosure.

In some implementations, robot 200 can be communicatively coupled to a network. FIG. 3 is a functional block diagram of system 300, which includes robot 200 communicatively and/or operatively coupled to network 302 in accordance with some implementations of this disclosure. Network 302 can comprise a collection of hardware, software, services, and/or resources that can be invoked to instantiate a virtual machine, process, or other resource for a limited or defined duration, or an unlimited or undefined duration. Network 302 can be communicatively and/or operatively coupled to a plurality of devices, systems, and/or servers, including devices and/or servers that have access to the internet. One or more of access points, such as access points 304A and 304B, can be devices, systems, and/or servers, including, but not limited to, computers, mobile devices, tablets, smart phones, cells phones, personal digital assistants, phablets, e-readers, smart watches, set-top boxes, internet streaming devices, gaming consoles, smart appliances, and/or any device with access to the internet and/or any network protocol. Although two access points are illustrated, there can be more or fewer access points as desired.

As used herein, network 302 can be operated: network 302 can have onboard computers that can receive, process, and/or send information. These computers can operate autonomously and/or under control by one or more human operators. Similarly, network 302 can have access points (e.g., access points 304A and 304B), which can similarly be used to operate network 302. The access points can have computers and/or human operators that can receive, process, and/or send information. Accordingly, references herein to operation of network 302 can be applied to a human operator and/or a computer operator.

In some implementations, one or more robots that are substantially similar to robot 200 can be communicatively and/or operatively coupled to network 302. Each of these robots can communicates statuses, commands, and/or operative data to network 302. Network 302 can also store and/or communicate statuses, commands, and/or operative data to these one or more of robots. In some cases, network 302 can store maps, sensor data, and other information from robot 200 and/or other robots. Network 302 can then share experiences of a plurality of connected robots to each other. Moreover, with the aggregation of information, network 302 can performed machine learning algorithms to improve performance of the robots.

A person having ordinary skill in the art would appreciate from the contents of this disclosure that some portions of this disclosure may be performed by robot 200, network 302, and/or access points 304A and/or 304B. Though certain examples may be described with reference to one or more of robot 200, network 302, and/or access points 304A and/or 304B, it would be appreciated that the features of the examples can be distributed amongst robot 200, network 302, and/or access points 304A and/or 304B to achieve substantially similar results.

Figure 4:
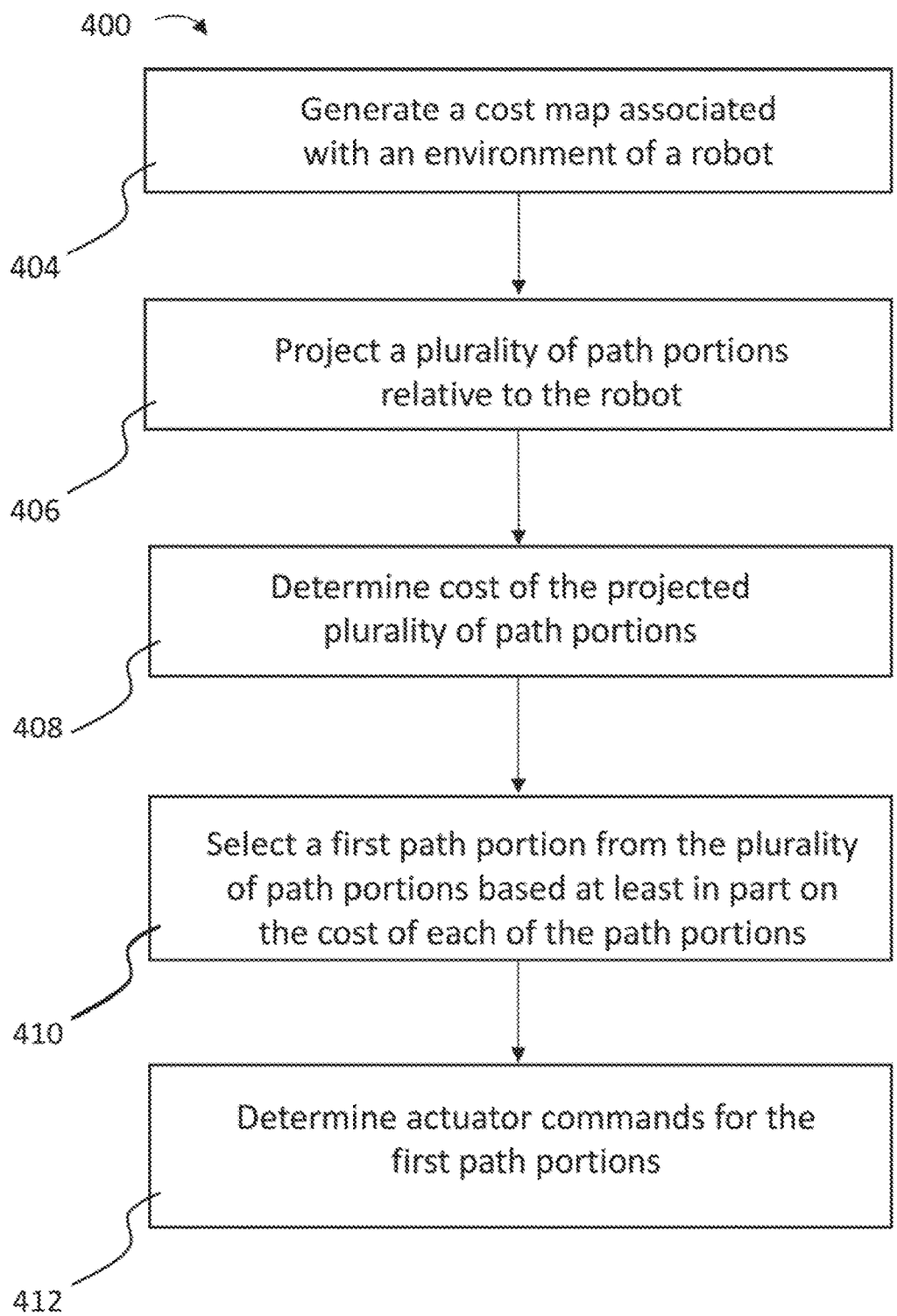
FIG. 4 is a process flow diagram of an exemplary method for operating robotic path planning of a robot in accordance with some implementations of this disclosure.

FIG. 4 is a process flow diagram of an exemplary method 400 for operating robotic path planning of robot 200 in accordance with some implementations of this disclosure. While this example may be described on occasion in this disclosure in the context of floor cleaning, a person having ordinary skill in the art would appreciate that method 400 can be readily applied to other robotic applications given the contents of this disclosure, including, without limitation, any of the applications otherwise described in this disclosure.

Block 404 includes generating a cost map associated with an environment of a robot. For example, robot 200 can perform a robotic task. By way of illustration, the robotic task can be cleaning, such as floor cleaning. As a result of the floor cleaning, it can be desirable for robot 200 to travel to predetermined places on a floor and/or map. For example, it can be desirable for robot 200 to clean substantially the entire surface of a floor, thereby making it desirable for robot 200 to travel to substantially all areas of a floor (e.g., at least once, but travelling to areas a plurality of times can also be desirable). As another example, there can be sections of a floor in which it is desirable for robot 200 to clean, thereby making it desirable to have the robot travel to those sections. As another example, there can be sections of a floor in which it is not desirable for robot 200 to clean. For example, floor cleaners of hard surfaces (e.g., cleaners of tile, ceramics, concrete, etc.) may not be able to clean soft surfaces (e.g., carpet, artificial grass or turf, mats, and/or other soft surfaces), or vice versa. In some cases, using the floor cleaner on the wrong surface can lead to damage, such as water damage, wear, chipping, and/or other damage to the surface and/or robot 200.

As another example, robot 200 can be a transportation robot, wherein it is desirable for robot 200 to travel to certain locations, and in some cases, in a particular order. This can be desirable in order to follow a schedule, efficiently and/or effectively navigate, provide predictability of transportation (e.g., of goods, people, animals, etc.), pick up only certain things for transportation, avoid traffic, and/or any other desirable characteristics of transportation. In such cases, robot 200 not travelling to certain locations (and/or in a certain order) can result in goods, people, animals, etc. not being transported. Accordingly, it may be desirable for a robot to travel to certain areas, locations, and/or positions in the course of performing a robotic task.

Other analogous robotic situations would be readily apparent to a person having ordinary skill in the art given the contents of this disclosure. For example, a robotic arm can perform the robotic task of moving objects. It can be desirable for a robotic arm to maneuver to particular locations/positions in order to pick-up and/or drop-off objects.

In some implementations, the aforementioned preferences for robotic tasks/operation can be realized at least in part in a cost map. In some implementations, the cost map can be reflective at least in part of the value of the preference of travel (e.g., navigation, movement to, etc.) of robot 200 to particular locations. In some cases, such travel can be to perform a robotic task.

By way of illustration, the cost map can be a two-, three-, four- or more dimensional data structure wherein portions of the cost map correlate to locations (e.g., relative and/or absolute) in an environment. In some cases, those locations can be correlated to time, where the characteristics of the locations can change over time. For example, in a two-dimensional ("2D") map, each pixel can correlate at least in part to a physical location in the environment in which robot 200 navigates. Similarly, in a three-dimensional ("3D") map, each voxel can correlate at least in part to a physical location in the environment in which robot 200 navigates. In some implementations, a 2D map can be used where robot 200 operates in substantially planar operations (e.g., where the movements of robot 200, whether on a level surface or otherwise, operate within a plane, such as left, right, forward, back, and/or combinations thereof). In some implementations, a 3D map can be used where robot 200 operates in more than planar operations, such as up, down, row, pitch, and/or yaw in addition to left, right, forward, and back). Where a space has more characteristics associated with locations (e.g., temperature, time, complexity, etc.), there can be more dimensions to the map.

In some implementations, a value can be associated with one or more pixels (while pixel is used here, the principles are readily applicable to voxels and/or any other analog in different dimensions) of the cost map, indicative at least in part of the relative value associated with the pixel. For example, the cost map can comprise binary values, where one value can be indicative at least in part of areas to which it is desirable for a robot 200 to travel, and another indicative at least in part of places where it is not desirable for robot 200 to travel. As another example, the cost map may have different values associated with a pixel, wherein the magnitude of the value can be indicative at least in part of how desirable and/or undesirable it is for robot 200 to travel to the pixel.

Figure 5A:
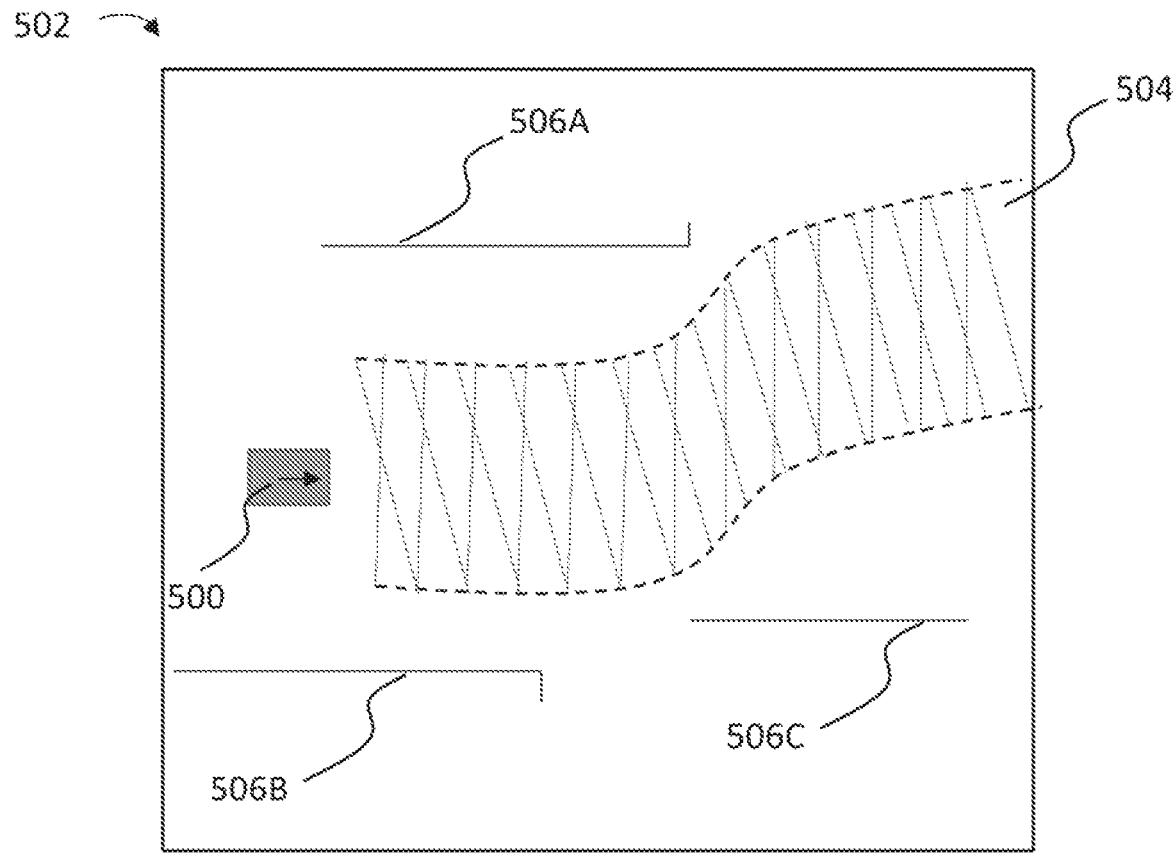
FIG. 5A is an overhead view graphical representation of a cost map in accordance to some implementations of this disclosure.

FIG. 5A is an overhead view graphical representation of a cost map in accordance to some implementations of this disclosure. Cost map 502 includes a map that correlates with an environment of robot 200. For example, robot indicator 500 indicates the position of robot 200. In some cases, robot indicator 500 may not be actually present on cost map 502. Indicators 506A-506C can indicate at least in part the position of obstacles, such as walls. Indicator 504 can be indicative at least in part of a desirable travel path portion, wherein it is desirable for robot 200 to travel within indicator 504. A person having ordinary skill in the art would appreciate that a cost map may not exist as an image, but rather a data structure with values. However, in some cases, the cost map can exist as an image, such as cost map 502, and/or be more readily visualized as an image.

Indicators 506A-506C can have values associated with the pixels contained therein. These values can be indicative at least in part of a preference for robot 200 not to go to those locations (e.g., crash into the obstacles). Similarly, values can be associated with the pixels contained in indicator 504, indicating a preference for robot 200 to travel to those locations.

For example, robot 200, including controller 204, can be configured to maximize the values associated with the pixels that robot 200 touches while traveling a path portion. Accordingly, pixels in indicator 504 can have a higher value than pixels in other places. Moreover, pixels of indicators 506A-506C can have lower values, and/or negative values, to indicate preferences for robot 200 not to go to those locations. As another example, robot 200 can be configured to minimize the value of the pixels it touches. Accordingly, pixels in indicator 504 can have lower values, and/or negative values, to indicate a preference of robot 200 to go to those locations. Similarly, in this situation, pixels of indicators 506A-506C can have higher values to indicate preferences for robot 200 not to go to those locations. A person having ordinary skill in the art would appreciate that there are any number of ways a person can configure robot 200, and controller 204, to give robot 200 a relative preference to go to a location based on a cost map. In some cases, robot 200, and controller 204, tries to go to locations associated with more desirable pixels in the cost map.

In some implementations, the cost map can be dynamic, changing over time and as robot 200 moves. For example, objects in the environment (e.g., as indicated by indicators 506A-506C) can move over time. Moreover, values of pixels in indicator 504 can also change over time. For example, after robot 200 travels across a pixel, it may become less preferable, or not preferable at all, for robot 200 to travel to the location associated with the pixel again. As a result, the value associated with such a travelled pixel can indicate less preference (e.g., lower where high pixel values are indicative at least in part of preference or higher where lower pixel values are indicative at least in part of preference) than other pixels associated with locations to which robot 200 has not travelled. However, such travelled pixels may still be valued in a way that indicates more preference than pixels of objects (e.g., pixels of indicators 506A-506C) or pixels of other locations. As another example, obstacles can move into the path, such as into locations associated with pixels of indicator 508. Besides obstacles and/or objects, there can be other environmental factors that can be undesirable, such as surface type, reflectance in an area, interference (e.g., due to electronic or other components), hazards, density of people and/or items, blockages, undesirably of the robot (e.g., due to social events or other occurrences), and/or other factors.

In some implementations, there can also be costs associated with the maneuvering that robot 200 must accomplish in order to go to such locations. For example, robot 200 can travel along trajectories that touch proximal pixels, but may not be able to jump over pixels in order to go to other locations. Accordingly, there can be a preference for close pixels, and such pixels can have values reflective of that preference. Also, there can be a preference for pixels that can be reached through certain maneuvers of robot 200, such as by going straight and making gradual turns, as opposed to making sharp turns and U-turns. Moreover, generally, the values of pixels can be indicative at least in part of the resources expended by robot 200 to get to those locations. Accordingly, robot 200 can optimize its travel to move to preferred locations according to the cost map and avoiding locations that are not preferred.

In some implementations, the cost map can include, directly or indirectly, information relating to robotic tasks. For example, where robot 200 is a floor cleaner, it may be desirable for robot 200 to clean in some places but not others. Accordingly, the cost map can indicate which areas robot should clean by, e.g., spraying water, operating a brush, mopping, etc. In some cases, this indication can be done by a cleaning parameter, which designates areas to be cleaned. In some cases, this indication can be done by the cost value itself, where higher values (e.g., above a predetermined operation threshold) and/or lower values (e.g., below a predetermined operation threshold) can be indicative in part of robot 200 performing a robotic task.

Figure 5B:
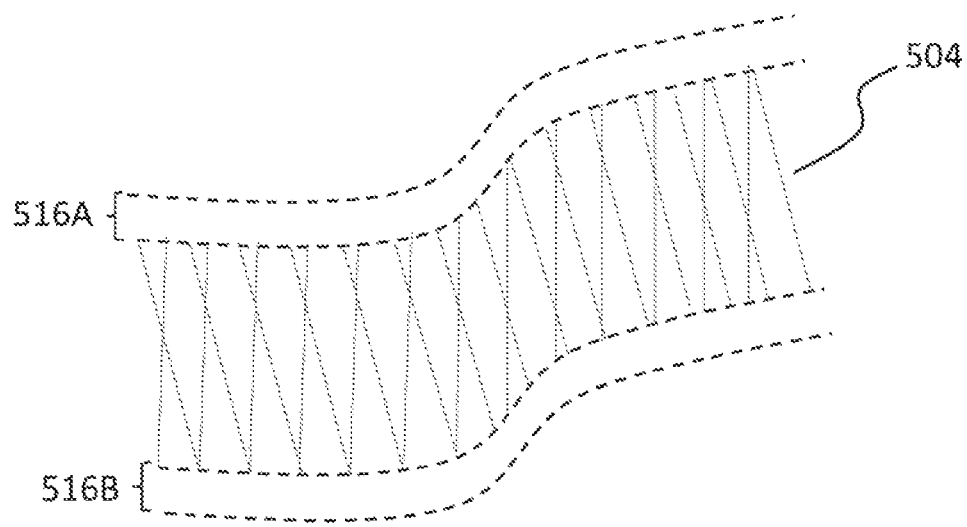
FIG. 5B is an overhead view graphical representation of a cost map having skirts around indicator in accordance to some implementations of this disclosure.

FIG. 5B is an overhead view graphical representation of a cost map having skirts 516A and 516B around indicator 504 in accordance to some implementations of this disclosure. The pixels in indicator 504 can indicate a preference for robot 200 to travel. For example, where robot 200 is a floor cleaner, it can be desirable for robot 200 to cleaning a particular area. However, leaving that area may not be preferable. For example, leaving an area could lead to surface damage (e.g., if the floor cleaner is supposed to clean a hard surface but goes to a soft surface) and/or other hazards/damage. Accordingly, it can be desirable to prevent robot 200 from straying off a path of motion. Skirts 516A and 516B illustrate means to prevent robot 200 from straying off the pixels of indicator 504. Accordingly, skirts 516A and 516B can contain pixels of un-preferred value (e.g., lower and/or negative values when higher values are preferred, or higher values when lower values are preferred). Advantageously, this can allow robot 200 to be restricted to certain areas, in some cases preventing any damage robot 200 could cause by leaving the area.

In some implementations, the values of the cost map can be determined (e.g., calculated) using a cost function. The cost function can assign values to each pixel based on any of the aforementioned preferences. The cost function can be dependent on time, causing in part changes to assigned values of pixels over time. Advantageously, this time dependency can allow the pixel values of the cost map to change over time. In some implementations, the cost function can lead to a decay of value over time in order to account for robot movements.

A challenge in generating the cost map of Block 404 is managing the use of memory and processor power. More pixels require more memory to store. The number of pixels can be related to the size, resolution, and/or dimensionality of the cost map. This size, resolution, and/or dimensionality can relate to at least the range of the path planned, the detail, and/or the complexity of a space. Moreover, how much memory each pixel utilizes can relate to the value (e.g., the form of data) associated with each pixel and the data structure which is utilized for the pixel. Also, memory and processor usage associated with the cost map can be dependent on the number of operations performed on the cost map. Accordingly, the size (e.g., number of pixels) of the cost map can be determined based at least in part on the memory budget for processing, which can vary between robots.

In some implementations, it can be advantageous to have the cost map be robot-centric. For example, having a common format for cost maps can allow them to be readily compared. Moreover, robot-centric cost maps can normalize the cost maps allowing them to be relative to a persistent element (e.g., robot 200 will be where robot 200 is measuring) rather than transitory portions of the environment (e.g., a starting position).

Figure 6:
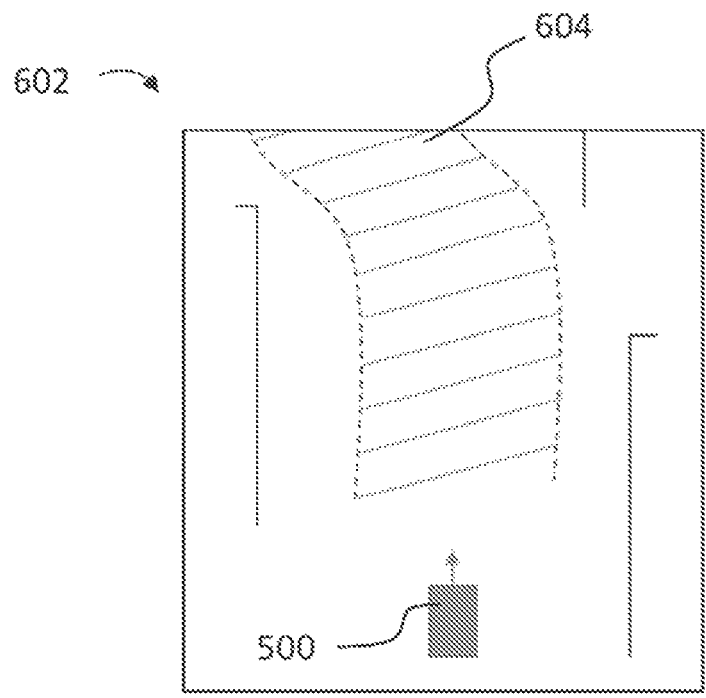
FIG. 6 is a top view of a cost map that is robot centric for a robot in accordance to some implementations of this disclosure.

By way of illustration, FIG. 6 is a top view of a cost map 602 that is robot centric for robot 200 in accordance to some implementations of this disclosure. Robot icon 500 can correlate to the relative position of robot 200 in space as it is represented in cost map 602. For example, indicator 604 indicates a desirable area for robot 200 to travel as represented in cost map 602.

In some implementations, the cost map may already be created as robot-centric. For example, sensor measurements can already in robot-centric/egocentric view (e.g., LIDAR ranges of obstacles with respect to robot), thus the measurements can be projected onto a robot-centric cost map. In such cases, block 406 can be skipped and/or combined with block 404 in some implementations.

Where cost maps are created that are not robot-centric, the cost maps can be rotated so that the cost maps are robot centric. For example, the cost map (and/or other maps, such as operational maps that relate to the path of travel or robotic tasks) can be rotated by robot 200 (e.g., controller 204) so that the robot is stationary within the cost map and everything else (e.g., features of the environment and/or the path of robot 200) is relative and/or projected around the stationary robot 200. Advantageously, this allows different alternative paths of robot 200 to be explored while minimizing the computations of the comparison. Moreover, the ego (e.g., robotic) centric view limits down available options and/or permutations where not all orientations robot 200 have to explored. Instead, in some implementations, available options are limited based on what robot 200 sees from the position of robot 200.

Figure 7A:
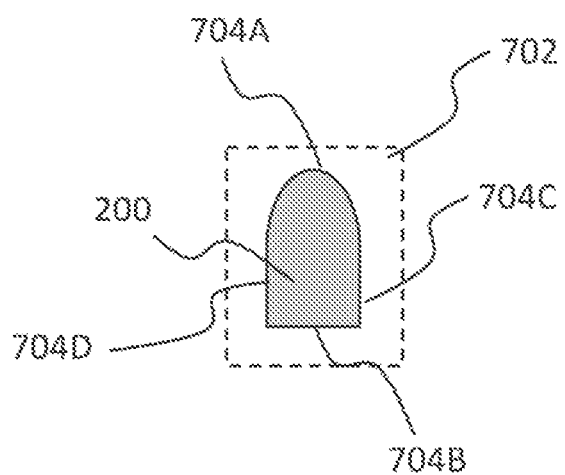
FIG. 7A is a top view diagram illustrating a robot footprint of robot in accordance with some implementations of this disclosure.

Block 406 then includes projecting a plurality of path portions relative to robot 200. These trajectories can comprise possible trajectories of robot 200 in a space. In some implementations, these trajectories can take into account the shape of robot 200. For example, robot 200 can have a size and shape as determined by the chassis and/or external elements of robot 200. Moreover, robot 200 can have a predetermined footprint, which can include the size and shape in which robot 200 perceives itself. In order to illustrate a robot's predefined footprint of itself, FIG. 7A is a top view diagram illustrating robot footprint 702 of robot 200 in accordance with some implementations of this disclosure. Robot 200 can have a predefined body shape and dimensions. Robot 200 can include a body with a plurality of sides, such as front side 704A, right side 704C, left side 704D, and back side 704B. Robot 200 can also have a top side and a bottom side. A person having ordinary skill in the art, given the contents of the present disclosure, would appreciate that robot 200 can have other sides as well, corresponding to the surfaces of robot 200, which can vary by shape (e.g., rectangular, pyramidal, humanoid, or any other shape). By way of illustration, front side 704A can be positioned on the forward-facing side of robot 200, where the forward-facing side is forward in the direction of forward movement of robot 200. Back side 704B can be positioned on the backward-facing side of robot 200, where the backward-facing side is the side facing in substantially the opposite direction of the forward-facing side. Right side 704C can be the right-hand side relative to front side 704A, and left side 704D can be the left-hand side relative to front side 704A.

The actual body shape of robot 200 is illustrated; however, footprint 702 can be the size of robot 200 configured in the software and/or hardware of robot 200 for determining how robot 200 can navigate and/or perform tasks. By way of illustration, footprint 702 can extend (as illustrated) beyond front side 704A, right side 704C, left side 704D, and/or back side 704B, creating a difference between what robot 200 perceives is the size of robot 200 in software and/or hardware (e.g., footprint 702) and what the actual size/shape of robot 200 is in reality. This can allow clearance between robot 200 and/or objects in an environment. Advantageously, footprint 702 can allow a safety buffer for navigation. The size and/or shape of footprint 702 can be based at least in part on a number of factors, including desired clearance, complexity of environments, tolerance to assists, risk of collision (e.g., the occurrence of, the amount of damage of, etc.), and/or other factors. As illustrated, footprint 702 is rectangular; however, footprint 702 can take on any shape desirable, such as square, triangular, rectangular, parallelogram asymmetric shapes, curves, etc. Moreover, footprint 702 is illustrated from a top view, seen as two-dimensional. However, in some cases, footprint 702 can be three-dimensional, reflecting the perception of robot 200 from a plurality of surfaces of robot 200.

As illustrated, in some implementations, footprint 702 can be larger than the actual size of robot 200. A person having ordinary skill in the art, given the contents of the present disclosure, can appreciate that the amount of clearance from each side of footprint 702 relative to robot 200 can vary independently at different points, wherein footprint 702 can be a different shape and/or size from robot 200, have asymmetric clearances, and/or include variations throughout. In some implementations, footprint 702 can be substantially similar in size and/or shape to robot 200, creating no clearance. Advantageously, having this substantial similarity can allow robot 200 to closely navigate around objects and/or minimize operator assistance for situations where robot 200 perceives that it cannot fit, yet can actually fit. However, having this substantial similarity between robot 200 and footprint 702 may provide increased risks of collisions due to noise and/or aberrations in mapping and/or navigation of robot 200.

In planning where to go, robot 200 can plan trajectories, which can include the course (e.g., including traveling vector) robot 200 will travel in a space. In some implementations, it can be advantageous for robot 200 to determine a predetermined number of trajectories. These trajectories can be representative of the possible movements of robot 200, such as the possible movements in space of robot 200 in order to navigate an area. In some implementations, the predetermined number can be determined based at least in part on memory and processing power, speed of processing, complexity of the environment through which robot 200 navigates, the number of possible orientations of robot 200, the DOF of robot 200, the amount of space covered in the trajectories, the amount of time covered in the trajectories, the amount of time used in order to complete a trajectory, and/or other factors. In some cases, the predetermined number of trajectories balances the desire to review as many trajectories as possible against the practical consideration of determining where to travel in real time and economizing robotic resources. In some exemplary implementations in the application of floor cleaners, 5000 trajectories were a sufficient predetermined number of trajectories. However, other numbers are envisioned, and should expand with the availability of processing and storage technology, based at least in part on the aforementioned factors, such as hundreds, thousands, millions or more trajectories.

In some implementations, the trajectories can comprise sub-movements of elements of robot 200. For example, where robot 200 has a plurality of wheels and is navigating, the trajectory can be defined by the robot driving configuration, such as quantity and positions of one or more of the wheels of robot 200. By way of illustration, in some robots that have a plurality of wheels, some wheels can be used to steer the robot. For example, a robot all-wheel, four-wheel, front-wheel, and/or rear-wheel drive. Trajectories can include movements of the one or more wheels.

Figure 7B:
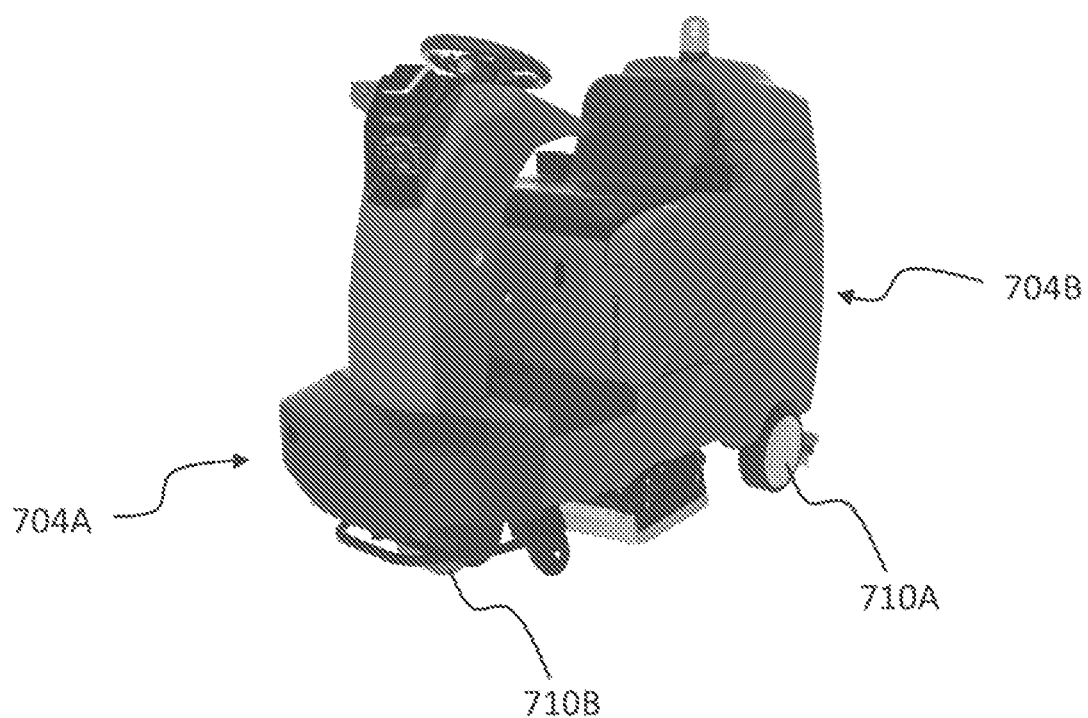
FIG. 7B illustrates an elevated left side view of a robot with three wheels in accordance with some implementations of the present disclosure.
Figure 7C:
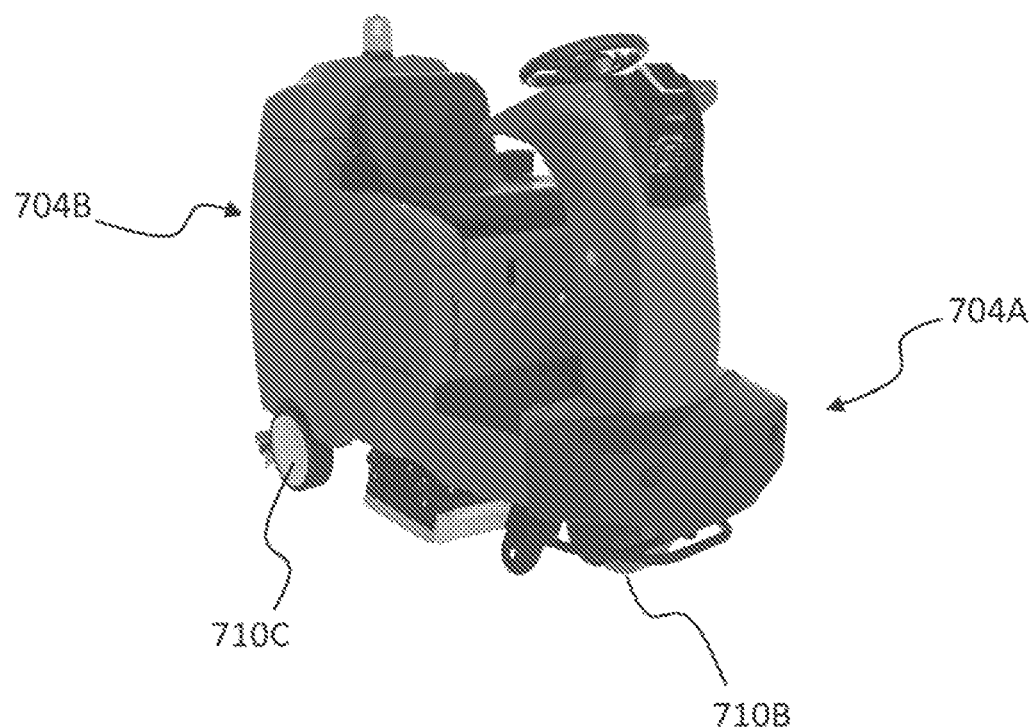
FIG. 7C illustrates an elevated right side view of a robot with three wheels in accordance with some implementations of the present disclosure.

By way of illustration, FIG. 7B illustrates an elevated left side view of robot 200 with three wheels in accordance to some implementations of the present disclosure. Similarly, FIG. 7C illustrates an elevated right side view of robot 200 with three wheels in accordance to some implementations of the present disclosure. As illustrated, in some implementations, robot 200 can have three wheels, where two wheels (e.g., wheels 710A and 710C) can be positioned proximal to back side 704B and one wheel (e.g., wheel 710B) can be positioned proximal to front side 704A. In this illustration, robot 200 can be rear-wheel driven, where wheels 710A and 710C can provide driving power and wheel 710B can provide steering, based at least in part on the angle to which wheel 710B is positioned. For example, wheel 710B can be positioned perpendicular to the body of robot 200 such that robot 200 goes straight. Similarly, wheel 710B can turn across an angle to turn robot 200. The angle can be a number of discretized and/or analog degrees, such as ranging from −90 to 90 degrees, and/or any range of degrees as desired for maneuvering. In some implementations, the turning of wheel 710B can be controlled by an actuator, such as a steering motor. This actuator can turn wheel 710B according to, at least in part, motor commands. In some implementations, additional elements can also control the positioning of wheel 710B, such as stabilizers, shock absorbers, manual feedback (e.g., from forces placed on wheel 710B from the environment), and/or other elements.

In some implementations, the trajectories can be divided into a series of actuator commands. For example, in some implementations, the actuator commands can determine the angle of wheel 710B in order to control the navigation of robot 200. For example, the actuator command can be a primitive (e.g., send a predetermined voltage for a predetermined time interval) and/or a higher-level command (e.g., set wheel to a determined degree). Accordingly, in the course of controlling the movement of robot 200, robot 200 can issue a series of actuator commands over time.

Figure 7D:
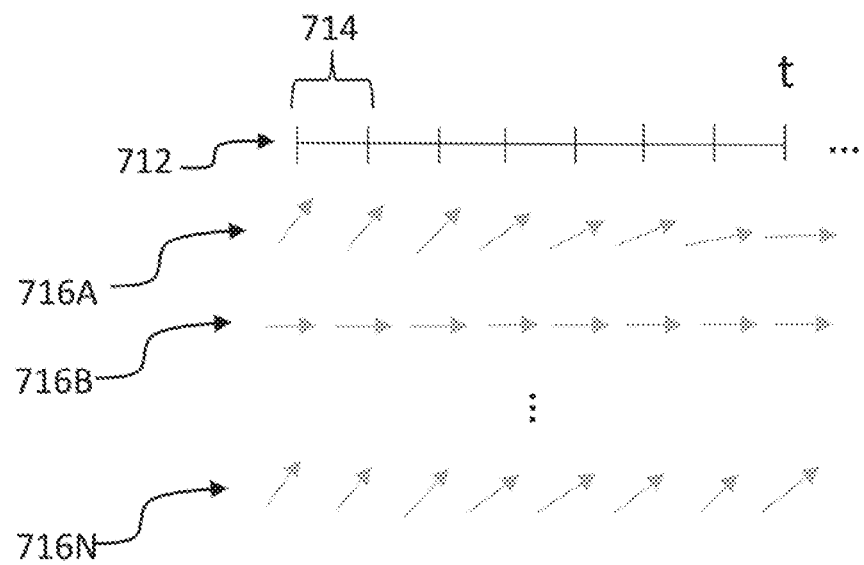
FIG. 7D is a chart of controller characteristics over time in accordance with principles of this disclosure.

FIG. 7D is a chart of controller characteristics over time in accordance with principles of this disclosure. Timeline 712 is illustrative of a period of time over time t. Timeline 712 can be divided into units (e.g., segments), such as unit 714. The segments can be of substantially equal size and/or not substantially equal size, depending at least on: the rate at which actuator commands are applied, the ability for actuators to respond, the amount of maneuvering desired of robot 200, the speed of robot 200, and/or other factors. The number of units in timeline 712 can depend at least in part on the complexity of the maneuvering of robot 200, memory and/or processor resources, desired resolution, the number of trajectories calculated, and/or other factors. Similarly, the period of time can depend at least on: the rate at which actuator commands are applied, the ability for actuators to respond, the amount of maneuvering desired of robot 200, the speed of robot 200, complexity of the maneuvering of robot 200, memory and/or processor resources, desired resolution, the number of trajectories calculated, and/or other factors. In some exemplary implementations, the period of time was approximately 2.5 seconds with 25 units. However, other times and/or number of units are contemplated based at least in part on the aforementioned factors. For example, time periods of 1, 2, 3, 4, 5, 6 or more seconds can be used, and/or periods there between. The number of units can be any desired value, such as values including or between 0 to 100, thousands, or more.

For each segment, a control characteristic can be calculated. For example, in the example of robot 200 illustrated in FIGS. 7B and 7C, the control characteristic can be the wheel angles of wheel 710B and/or the linear velocity of robot 200. By way of illustration, robot 200 can use a set of predetermined velocities over a set of predetermined wheel angles. These predetermined velocities and wheel angle can be combined to manipulate the movements of robot 200. Other examples of control characteristics are envisioned as well. For example, where robot 200 is a robotic arm, the control can be a position of an actuator controlling the position of the arm. In some cases, there can be a plurality of actuators controlling various DOFs of robot 200, whether robot 200 is a robotic arm, multi-wheel vehicle, walking robot, and/or any other robot. Accordingly, at a given time instance there can be a plurality of controls characteristics (e.g., stored in an array, matrix, or a plurality of structures) corresponding to the state of various actuators of robot 200.

Also at a given time instance, different variations of the control characteristic can be calculated. For example, lines 716A-716N illustrate N number of variations of the control characteristics. In some cases, these control characteristics can be a subset of all possible movements of robot 200. By way of illustration, the arrows illustrated can correspond to wheel angles of robot 200. This subset can be restricted and/or unrestricted as desired. For example, the subset can limit the control characteristics to those that gradually change (e.g., within a predefined range of variation from subsequent and/or proceeding control characteristics) to reflect realistic movements. As another example, the control characteristics can recognize obstacles and/or objects in the environment and only include those that avoid collisions. As another example, in some implementations, the control characteristics can recognize the footprint of robot 200 and only include maneuvers that give robot 200 sufficient clearance and/or are physically realistic given the size and shape of robot 200. However, in some cases, contrary to these example, trajectories may be calculated prior to knowledge about obstacles, thereby control characteristics may not take into account clearance and obstacle collisions. In another example, the control characteristics can take into account other factors of robot 200 that may have a bearing on how robot 200 can realistically navigate. By way of illustration, for a navigating robot, the weight of robot 200 can impact how sharply robot 200 can realistically turn. As another example, environmental factors, such as slipperiness of a surface, presence of dynamic features, lighting, moisture, temperature, and/or other environmental factors can affect the maneuverability of robot 200 in navigation and/or any other robotic task. The control characteristics can be limited to those that reflect realistic operation of robot 200 given those environmental factors. Advantageously, using one or more of the aforementioned restrictions can allow faster (and more efficient in terms of resources) computation by having fewer options to process and/or consider. Moreover, another advantage is that the aforementioned restrictions can allow robot 200 to operate a space with fewer issues.

On the other hand, considering more options can lead to a more complete analysis, which can, in some cases, allow for better decisions. For example, computing control characteristics without consideration of obstacles can recognize that obstacles can be dynamic and that some trajectories can be more favorable if obstacles move. Moreover, further eliminations of possible trajectories can be made at another block, such as block 408 which will be discussed later. In some cases, such computations can be done in advance (e.g., prior to adding additional complexity and/or constraints), still allowing for economical use of computational resources.

Accordingly, the N number of lines can correlate to the desirable number of control characteristics. In some cases, N can correlate with the number of trajectories (e.g., 5000 trajectories and/or any other number) and/or be predetermined based at least in part by memory and processing power, speed of processing, complexity of the environment through which robot 200 navigates, the number of possible orientations of robot 200, the DOF of robot 200, the amount of space covered in the control characteristics, the amount of time covered in the control characteristics, and/or other factors.

Figure 7E:
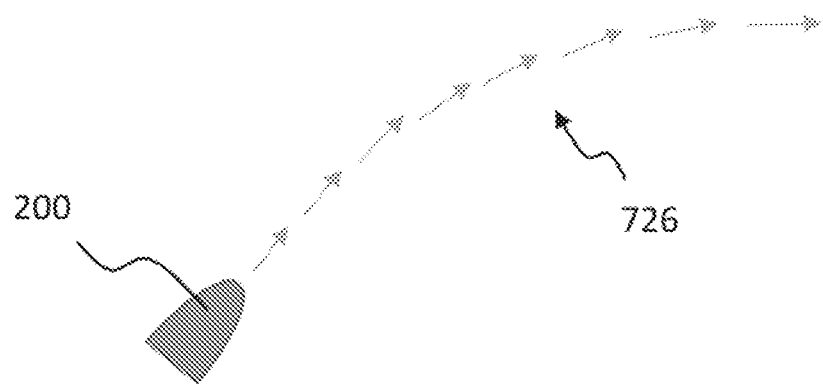
FIG. 7E is a top view diagram of a robot following a series controller characteristics in accordance with some implementations of the present disclosure.

In some cases, trajectories can be defined by control characteristics. FIG. 7E is a top view diagram of robot 200 following series controller characteristics in accordance with some implementations of the present disclosure. As illustrated, robot 200 follows the controller characteristics illustrated in line 716A. Accordingly, robot 200 can travel along trajectory 726 comprising the controller characteristics illustrated in line 716A, forming a gentle right turn. This trajectory can trace a path portion. Similarly, the other lines 716A-716N can form trajectories of travel of robot 200.

Figure 8A:
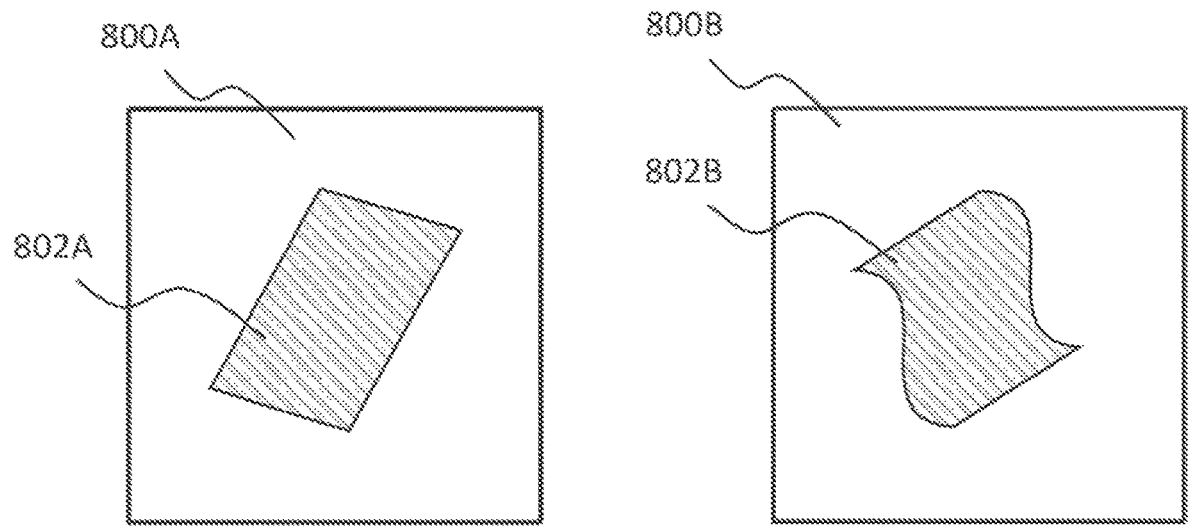
FIG. 8A includes path portion diagrams illustrating determined path portions in accordance to some implementations of the present disclosure.

FIG. 8A includes path portion diagrams 800A and 800B illustrating determined path portions in accordance to some implementations of the present disclosure. In some cases, these diagrams can also be called masks. For example, path portion 802A can be a graphical representation of a path determined from a trajectory of robot 200. Such a trajectory can comprise controller characteristics, such as those described with reference to FIGS. 7B and 7C and elsewhere in this disclosure. Path portion 802A can have a first shape indicative at least in part of the area to which robot 200 navigates. Similarly, path portion 802B can be another graphical representation of a path determined from a trajectory of robot 200. Such a trajectory can comprise controller characteristics, such as those described with reference to FIGS. 7B and 7C and elsewhere in this disclosure. A person having ordinary skill in the art would appreciate that while some graphical representations are shown as path portion diagrams 800A and 800B, the path portion can be stored as other data structures, such as matrices, images, arrays, vectors, and/or any other data structure known in the art.

In some implementations, the determined path portions illustrated in path portion diagrams 800A and 800B can be relative to, and/or centered around, robot 200 (e.g., substantially similar to as described with reference to FIG. 6). In some cases, where each determined path portion is relative to robot 200, determined path portions can readily be compared.

Figure 8B:
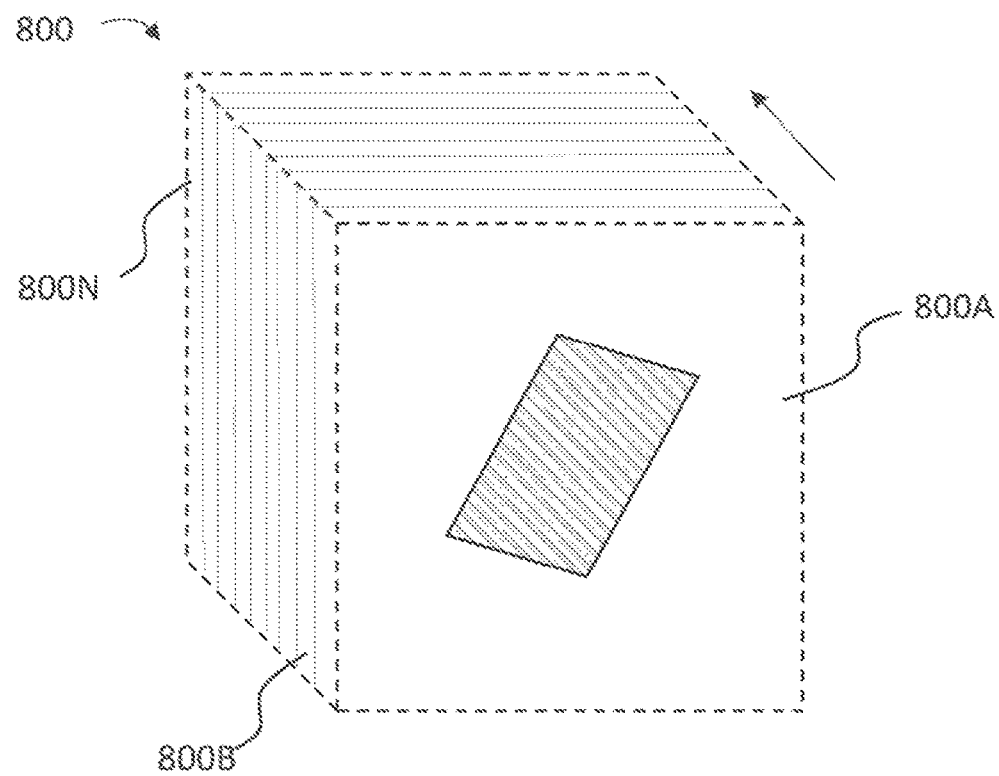
FIG. 8B is a graphical representation of a three-dimensional matrix of path portion diagrams in accordance to some implementations of the present disclosure.

For example, a plurality of path portions can be determined. FIG. 8B is a graphical representation of a three-dimensional matrix 800 of path portion diagrams in accordance to some implementations of the present disclosure. Matrix 800 can include N path portions, where N can correlate to the desirable number of path portions to consider. In some cases, N can correlate with the number of trajectories (e.g., 5000 trajectories and/or any other number), control characteristics, and/or be predetermined based at least in part by memory and/or processing power, speed of processing, complexity of the environment through which robot 200 navigates, the number of possible orientations of robot 200, the DOF of robot 200, the amount of space covered in the control characteristics, the amount of time covered in the control characteristics, and/or other factors.

Returning to FIG. 4, block 408 can include determining the cost of the projected plurality of path portions. In some implementations, the cost of a path portion can be determined with reference to a cost map (e.g., a cost map substantially similar to the cost map described with reference to FIGS. 5A-5B, 6). Accordingly, the cost of travelling via the path portion can be calculated.

Where a path portion diagram is determined, and the cost map and the path portion diagram are orientated substantially similarly (e.g., both relative to, and/or centered around, robot 200), the cost of a path portion can be readily calculated. For example, taking the dot product between a cost map and a path portion diagram can compute the cost associated with the path portion diagram. Accordingly, where there is a plurality of path portion diagrams, the dot product between a cost map and the plurality of path portion diagrams can give the cost associated with each path portion diagram. In the case where matrix 800 includes the plurality of path portions, the dot product of the matrix and the cost map will calculate the costs of the path portions included in matrix 800. Advantageously, this can allow the rapid, and clean calculation of a plurality of path portions so that they can be compared.

Block 410 can include selecting a first path portion from the plurality of path portions based at least in part on the cost of each of the path portions. For example, the dot product between the cost map and a mask can be taken in order to find the cost associated with a mask. Where higher values in the cost map are assigned to places to which it is desirable for robot 200 to travel, finding the substantial maximum and/or higher values as a result of the dot product can be indicative of an optimal path. As another example, where lower values in the cost map are assigned to places to which it is desirable that robot 200 travels, finding the substantial minimum and/or lower values as a result of the dot product can be indicative of an optimal path.

However, there can be other factors considered in addition to the cost and/or modifying the cost. For example, the maneuvering time for path portions can be considered. By way of illustration, a predetermined maneuvering time threshold can be predetermined. If maneuvering to complete a path portion takes longer than the predetermined maneuvering time threshold, the path portion can be disregarded and/or given a penalty (e.g., increasing the cost by a multiplier and/or additive). As another example, the cost map can be adjusted to reflect time saving maneuvers. By way of illustration, robot 200 can take a greedy approach in finding paths to maximize speed of maneuvering.

As another example, the shortest path field can be computed. For example, an end point can be determined for robot 200. For every path, the shortest path to the end point can be determined given the present orientation of the robot. In this way, the shortest path can be determined for every point in a map. Such shortest path to the end point can be used to adjust values of the cost map thereby making shorter paths (and/or realistic paths) more favorable. In some cases, the map comprising shortest paths can be an additional map, essentially forming a cost map. In some implementations, the shortest paths can further take into account obstacles, such as by using known algorithms in the art.

For example, the end point can be related to a limited horizon of robot 200. For example, robot 200 may plan and/or view a horizon that has a predefined distance and/or time range. For example, the horizon can be a predefined distance on the order of feet, yards, meters, etc. The horizon can be a predefined time (e.g., that robot 200 can travel before being out of range) in seconds, minutes, etc.

Figure 8C:
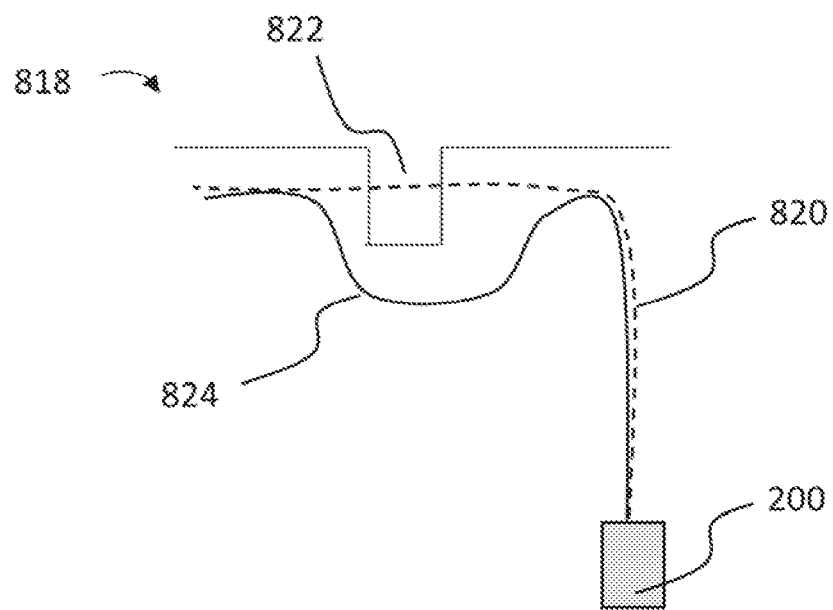
FIG. 8C is an overhead diagram of a trajectory of a robot that would cause the robot to run into an obstacle and a trajectory of the robot that would allow the robot to go around the obstacle in accordance to some implementations of this disclosure.

As an illustrative example, FIG. 8C is an overhead diagram of a trajectory 820 of robot 200 that would cause robot 200 to run into obstacle 822 and a trajectory 824 of robot 200 that would allow robot 200 to go around an obstacle 822 in accordance to some implementations of this disclosure. Map portion 818 illustrates a portion of an environment in which robot 200 is navigating. Map portion 818 can illustrate the horizon of view of robot 200, which can correspond to a cost map. As illustrated, trajectory 820 would pass through obstacle 822 thereby potentially causing a collision and/or causing robot 200 to be stuck in front of obstacle 822. The closer robot 200 gets to obstacle 822, the more limited the maneuvering of robot 200 can become. On the other hand, where robot 200 recognizes that it should travel around obstacle 822, robot 200 can then plan a more optimal path around obstacle 822, such as that illustrated as trajectory 824. This more optimal path as illustrated with trajectory 824 has robot 200 turning sooner.

Figure 8D:
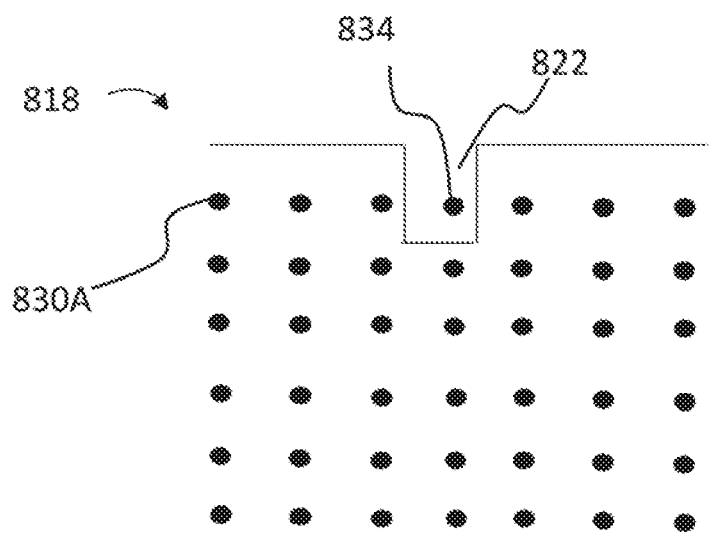
FIG. 8D is an overhead diagram illustrating a discretized version of a map portion, wherein each point is a discrete location in accordance with implementations of this disclosure.

In order to determine the shortest path, map portion 818 can be discretized, such as by looking at a plurality of points. FIG. 8D is an overhead diagram illustrating a discretized version of map portion 818, wherein each point is a discrete location in accordance with implementations of this disclosure. For example, point 830A can be a discretized point in map portion 818. In some implementations, non-navigable points can be included in the discretization, such as point 834, which can be within obstacle 822. In some implementations, non-navigable points may not be included. In some cases, each discretized point can also be called a cell.

In order to determine the shortest path (e.g., in a shortest path field), a point can be selected. Any point can be used, however, in some implementations, the point is a point along the horizon of robot 200, such as the substantially furthest point robot 200 can seeing going forward along the path (e.g., furthest in distance and/or time). Advantageously, this can allow robot 200 to plan the path going forward for when it travels. Robot 200 can then find the shortest non-colliding point from each discretized point (such as the discretized points illustrated in FIG. 8D) to that selected point.

Figure 8E:
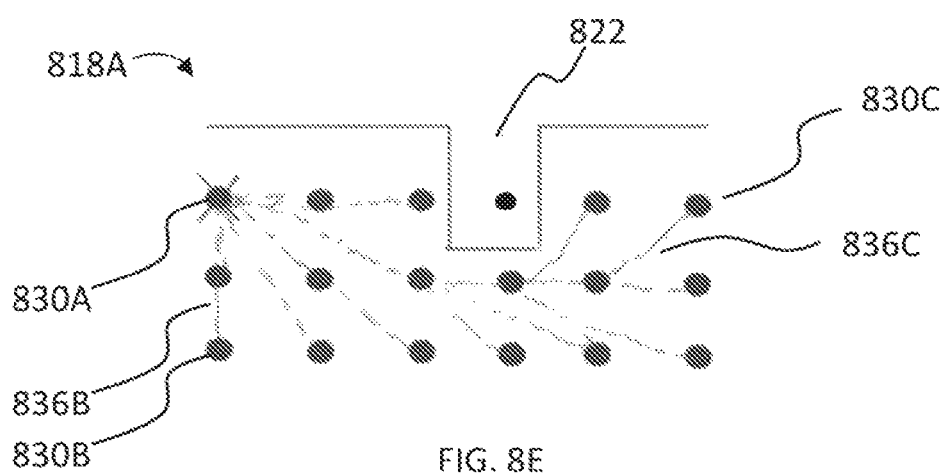
FIG. 8E is an overhead diagram showing the shortest non-colliding path from a section of discretized points illustrated in FIG. 8D in accordance to some implementations of this disclosure.

FIG. 8E is an overhead diagram showing the shortest non-colliding path from a section of discretized points illustrated in FIG. 8D in accordance to some implementations of this disclosure. For example, map portion 818A can be an illustrative portion (e.g., for illustrative purposes) of map portion 818. Point 830A can be selected point to which the shortest non-colliding path from the other points is calculated. For example, point 830B can be a discretized point and/or cell in map portion 818A. The shortest non-colliding path (e.g., not colliding with an object in the environment shown in map portion 818) can be shown by path 836B, which goes straight from point 830B to point 830A. As another example, point 830C can be another point on the opposite side of obstacle 822. Accordingly, the shortest non-colliding path between point 830C and point 830A is the curve path illustrated by path 836C, which goes around obstacle 822.

Figure 8F:
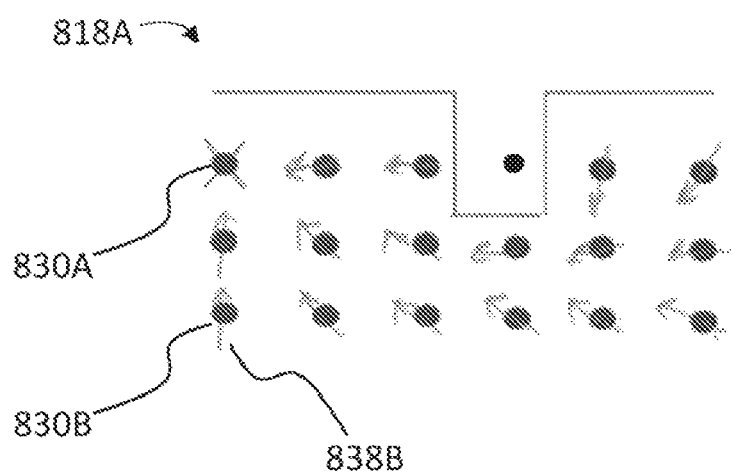
FIG. 8F is an overhead diagram showing vectors for shortest paths associated with discretized points illustrated in FIG. 8D in accordance to some implementations of this disclosure.

In some cases, the relevant information from the shortest path field is the vector (e.g., direction, orientation, pose, position, speed, etc.) of robot 200 at that point in order to travel the shortest path (e.g., shortest non-colliding path) to the selected point. Accordingly, a vector field can be generated showing the vector at each discretized point. FIG. 8F is an overhead diagram showing vectors for shortest paths associated with discretized points illustrated in FIG. 8D in accordance to some implementations of this disclosure. For example, point 830B corresponds to vector 838B, which gives the vector of robot 200 to travel the shortest path to point 830A.

In some implementations, the vectors for each discretized point can form a vector field associated with the shortest path. For ease of later computations, each vector can be of unit length in some cases. These vectors can be compared to the planned path portions and/or trajectories of robot 200, for example, the planned path portions included in matrix 800. For example, robot 200 can determine a vector associated with each planned path portion and/or trajectory. The vector can reflect the orientation, speed, position, pose, etc. of robot 200 as it begins the planned path portion and or trajectory. In some implementations, this vector can be of unit length in order to ease computation. Accordingly, the vector of each planned path portion and/or trajectory can be compared to the vectors of the vector field associated with the shortest path. In some cases, a comparison between the vectors can be made. For example, if the vectors differ in angle by at least predetermined angle, then the path portion and/or trajectory can be taken out of consideration. This predetermined angle can be determined based at least in part on computational resources, environmental complexity, computational time, empirical considerations, and/or other factors. It was found that a predetermined angle of 90 degrees was effective at removing from consideration path portions and/or trajectories that would not be realistically traveled. In other cases, a penalty can be assigned to path portions and/or trajectories corresponding to vectors that substantially differ from the angle of the trajectory associated with the shortest path. Such a penalty can be realized in a recovery matrix, cost map, and/or matrix (e.g., matrix 800), such as through a cost value, multiplier and/or additive. In some cases, the comparison can be computed by examining the dot product between the vector of the shortest path and the vector of the vector of a path portion and/or trajectory calculated by robot 200. In this way, when a trajectory and/or path portion has the appropriate direction that is substantially similar to the direction of the shortest path, it will be reflected in the dot product. This dot product can be a dependency of the cost function such that the value of trajectories and/or path portions that have the same initial direction as the shortest path are favored.

As another example, recovery conditions can be determined. Such recovery conditions can identify maneuvers for predetermined cases and/or situations. In some cases, a recovery condition can be a maneuver that robot 200 performs in order to get out of a situation, as will be described below through illustrative examples. In some cases, a recovery condition can influence the decision-making of robot 200, impacting at least in part a path or path portion that robot 200 uses.

Figure 9A:
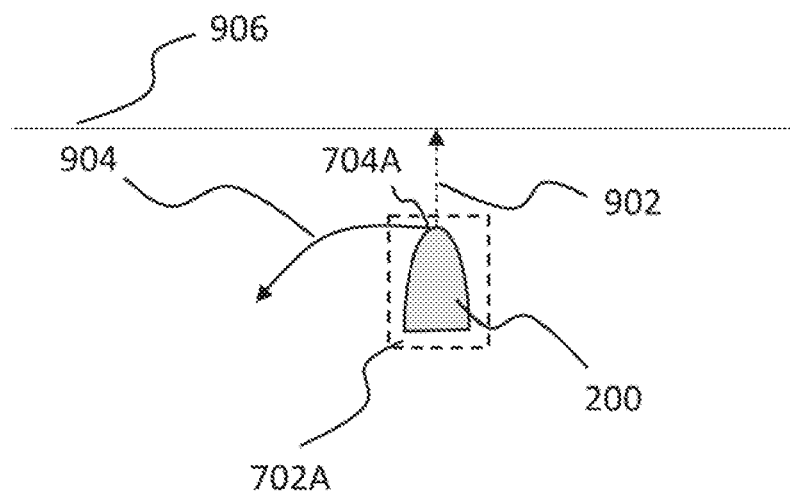
FIG. 9A is an overhead diagram of a robot facing a wall, thereby having limited forward mobility, in accordance to some implementations of this disclosure.

By way of illustration, FIG. 9A is an overhead diagram of robot 200 facing wall 906, thereby having limited forward mobility, in accordance to some implementations of this disclosure. While wall 906 is illustrated, other obstacles/objects in the way of robot 200 can be used in place of wall 906. As illustrated, robot 200 has a wall 906 proximal to front side 704A. From this position, forward trajectory 902 can cause robot 200 to go towards wall 906 and, possibly, collide with wall 906. Even where robot 200 does not collide with wall 906, the maneuverability of robot 200 as robot 200 gets closer to wall 906 becomes more limited, especially where the shape of robot 200 is non-circular, such as tricycle and/or other shaped. Accordingly, a turning path, such as the path defined at least in part on trajectory 904 can be desirable.

Based on the recovery conditions, certain trajectories can be removed from consideration and/or made more/less favorable. For example, in the diagram illustrated in FIG. 9A, trajectories that move robot 200 closer and/or into wall 906 can be taken out of matrix 800. As another example, trajectories that move robot 200 closer and/or into wall 906 can have a cost penalty, changing the cost function calculation for the mask thereby making them less likely to be selected. As another example, trajectories that are favorable (e.g., in FIG. 9A, trajectory 904 and/or other trajectories) can have a favorable cost impact, changing the cost function calculation for the mask thereby making them more likely to be selected. In some cases, robot 200 can select a predetermined maneuver, such as moving in a different direction (e.g., to a predetermined angle left or right) in order to no longer face wall 906 and/or any other obstacle.

In some cases, instead of modifying matrix 800, there can be another, recovery matrix. Advantageously, using an entirely other recovery matrix can be faster than adjusting values of individual trajectories. In such cases, the recovery matrix can be used instead of matrix 800 for determining the cost of trajectories. Accordingly, references in this disclosure described changing the cost function value, invoking a cost penalty, and/or a favorable cost impact can be relative to values in a recovery matrix. The use of a recovery matrix can be triggered by indicia relating to any of recovery condition, such as the example recovery conditions described herein. For example, when robot 200 detects a wall in front of it, it can use a recovery matrix reflective of costs associated with the various trajectory options that robot 200 can implement. As another example, the robot can determine that it is off-path and trigger utilize a recovery matrix associated with that occurrence to determine how to recover. In some implementations, robot 200 can utilize a recovery matrix once it has failed to determine a path using matrix 800. Accordingly, the recovery matrix can be an alternative and/or additional calculation once other calculations have failed to identify a trajectory for robot 200 to travel.

Figure 9B:
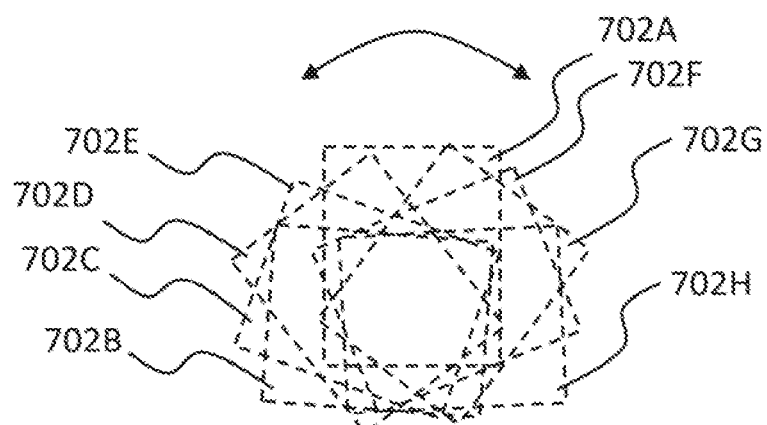
FIG. 9B is a top view diagram of a computed rotation of a footprint of a robot in accordance with some implementations of this disclosure.

As another example of a recovery condition, in the situation where robot 200 is limited in motion such as by being restricted by an obstacle (e.g., facing a wall such as wall 906), the recovery condition can determine a rotation of robot 200 in order to move away from the obstacle. By way of illustration, robot 200 can compute a rotation of robot 200. FIG. 9B is a top view diagram of a computed rotation of a footprint of robot 200 in accordance with some implementations of this disclosure. Footprint 702A can be indicative at least in part of the footprint of robot 200. For example, footprint 702A can be the footprint of robot 200 as it faces an obstacle (e.g., wall 906). Robot 200 can compute a rotation of footprint 702A, such as the position of footprint 702A rotated through a plurality of angles. Footprints 702B-702H illustrate example footprint rotation angles. The angles to which footprint 702A are rotated can be determined based at least in part on available memory and/or processing resources, range of available motion of robot 200, position of obstacle detected, shape and/or size of the footprint of robot 200, and/or other factors. In some implementations, a range of angles can be computed (e.g., determining at least in part the total area of rotation). This range can be predetermined, found on a case-by-case basis, and/or determined by trying all feasible rotations. The angles can be periodic and/or intermittent throughout the range of rotation. In some implementations, footprints 702B-702H can be rotated about a common center point, such as a center (e.g., geometric center, center of mass, turning center, etc.) of robot 200, and/or any other point.

Another example of a recovery condition can be for touching and/or close objects. For example, robot 200 can detect a pixel indicative of an object that is close, such as within a predetermined distance threshold. Such a predetermined distance threshold can be determined based at least in part on the stopping distance of robot 200, the speed of robot 200, potential damage of collision of robot 200 with the object, tolerance for collisions, the amount of space required for maneuvering robot 200, and/or other factors. Robot 200 can also detect a pixel indicative of an object within the footprint of robot 200. In those cases, it can be desirable that robot 200 move away from the object. As another example, robot 200 can collide with the object, wherein one or more pixels of the object protrude into the footprint of robot 200. In response to detecting a touching and/or close object, robot 200 can move in a direction away from the object, such as 180 degrees away from the object (e.g., reverse and/or turn around) or at an angle away from the object depending on the shape and/or maneuverability of robot 200 and/or the footprint of robot 200. This movement away can allow robot 200 to clear from the object before determining a path. In some cases, robot 200 can adjust the costs associated with various routes relative to the object. For example, paths away from the object can be more cost favorable than paths that cause robot 200 to go in a direction of the object.

Another example of a recovery condition can occur when robot 200 gets stuck in a decision loop. By way of illustration, robot 200 can select a path to travel, however, an obstacle can impede it from following that path. Robot 200 can then select another path to travel, for example, by selecting a different mask to follow. However, the obstacle can then move and block the robot. Other scenarios of blocking can occur due to sensor noise and/or artifacts that can cause robot 200 to detect blockage. As another scenario, a substantially stationary obstacle can be perceived to be moving because of a change, such as a rotation, that causes previously not visible parts of the obstacle to become visible. In some cases, cyclical decisions can occur where robot 200 repeatedly attempts to travel along a first path, but is impeded, then tries to travel along a second path. Robot 200 can then get in a cycle between attempting to travel the first path and second path, whereby robot 200 does not make any substantial progress to going to the navigational goal and/or finishing the operational task of robot 200.

In order to break such a cycle, a recovery condition can include a cyclic decision breaker. In some implementations, robot 200 (e.g., controller 204) can store (e.g., in memory 202) selected trajectories, paths/path portions, and/or control characteristics and look for repeats. For example, there can be a cyclic decision threshold wherein if a trajectory, path/path portion, and/or control characteristic is repeated greater than or equal to the cyclic decision threshold, the trajectory, path/portion, and/or control characteristic will no longer be considered and/or receive a cost penalty. The cyclic decision threshold can be the number of repeats over a predetermined time window and/or associated with a location (and/or substantially similar locations). In some implementations, the number of decisions of the cyclic decision threshold can be dependent at least in part on: environmental complexity; tolerance for indecision/standstill of robot 200; availability of operator assistance; similarity of repeats; and/or other factors. In some cases, the occurrence of three repeat decisions was found to be effective as a cyclic decision threshold.

As described, after the cyclic decision threshold has been met, robot 200 can no longer consider such repeated decision. Advantageously, this can break the cycle and allow robot 200 to find another path that may not lead to cyclic decision making.

In some implementations, in any of the aforementioned recovery conditions and/or selections, each time a trajectory, path portion, and/or control characteristic is selected, a cost penalty can be added to the cost map corresponding to the trajectory, path/path portion, and/or control characteristic selected. Alternatively, instead of adjusting the cost map, the penalty can be added to the mask of the trajectory, path/path portion, and/or control characteristic selected so that when the cost of the mask is determined, the cost will make it less likely that the mask (and therefore the trajectory, path/path portion, and/or control characteristic included therein) will be selected. As previously described, a separate recovery matrix can also be used.

In some implementations, recovery conditions and/or operating control characteristics (e.g., during normal operation or otherwise) can be determined as part of a learning process. Such a learning process can be implemented on robot 200 (e.g., using controller 204), network 302, access points 304A and/or 304B, and/or any other component of the robotic system. For example, the cost map can be adjusted, and/or recovery procedures can be implemented, based at least in part on past performance and/or feedback robot 200 receives. In some cases, user feedback can be stored in memory, such as in a library. The feedback can take the form of one or more of (a) control input; (b) absence of correction; (c) physical correction; (d) map correction; and (e) performance parameter. In some cases, learned cases can be integrated into the decision-making process, such as a mask in matrix 800.

For example, a control input can be performed physically on the robot 200 such as through manual operation. By way of illustration, a floor cleaner such as illustrated in FIGS. 7B and 7C, can be driven in manual operation using the steering wheel and foot pedals in a way substantially similar to a cart. As another example, an operator can use a remote control to input commands. The operator can be onsite and/or operating remotely, such as through one or more of network 302 and/or access point 304A or 304B. Accordingly, in problematic areas, an operator can drive robot 200 in order to clear the area. A person having ordinary skill in the arts would recognize that there are analogous applications in other robots. For example, an operator could drive a transportation robot in problematic area. As another example, an operator could control a robotic arm to perform a task. Accordingly, robot 200 can associate the context (e.g., sensor data, location, pose, environmental factors, etc.) with the manual operation that the operator performed (e.g., controller commands, trajectories, and/or path portions in the scenarios). In some cases, robot 200 can make it more likely that a trajectory, path/path portion, and/or control characteristic of the control input will be selected in a subsequent encounter with substantially similar context. In some implementations, increasing this likelihood can include changing cost map values to make the route more likely to be selected. In some implementations, robot 200 can automatically perform the demonstrated control input when the context comes up. Advantageously, systems and methods of this disclosure allow robot 200 to continuously learn and improve path planning as it receives more information.

As another example, the absence of correction can further entrench the path planning of robot 200. For example, each time robot 200 follows a path/path portion in a context and is not corrected, robot 200 can make it more likely that it will travel that path if the context arises again. This can be accomplished by adjusting the cost map to favor path/path portions substantially similar to what it performed. Advantageously, such behavior can allow robot 200 to continue having behaviors that are successful.

As another example, physical correction can be used to provide feedback to robot 200. Physical correction can include an operator physically touching and/or positioning robot 200. By way of illustration, where robot 200 is a robotic arm, an operator can adjust the robotic arm by turning one or more joints of the robotic arm and/or positioning the arm in space. As another example, an operator can lift at least a portion of robot 200 and reposition that portion as desired. Accordingly, robot 200 can observe the context in which the physical correction occurred. In some cases, robot 200 can make it more likely that a trajectory, path/path portion, and/or control characteristic of the physical correction will be selected in a subsequent encounter with substantially similar context. In some implementations, increasing this likelihood can include changing cost map values to make the route more likely to be selected. In some implementations, robot 200 can automatically perform the demonstrated control input when the context comes up. Advantageously, systems and methods of this disclosure allow robot 200 to adjust according to implicit fixes, such as when the user just physically corrects it. This ability can enhance the user experience by allowing user feedback without the formality of control input.

As another example, a map correction can be inputted by a user/operator. For example, a user can adjust a path, change a cost map, move a route, expand a route, close a route, and/or put further restrictions (and/or expansions) of portions of the environment to which robot 200 can travel. A user can do so through user interface unit 218, network 302, and/or access points 304A and 304B. In some cases, robot 200 can make it more likely that a trajectory, path/path portion, and/or control characteristic incorporating the change of the map correction will be selected in a subsequent encounter with substantially similar context. In some implementations, increasing this likelihood can include changing cost map values to make the route more likely to be selected. In some implementations, robot 200 can automatically perform the demonstrated control input when the context comes up. Advantageously, systems and methods of this disclosure can allow robot 200 to be corrected at different points in time and from different places, such as by a remote operator reviewing map and/or performance data. This ability can allow a more seamless user experience as the robot can gain efficiency between subsequent runs.

Figure 9C:
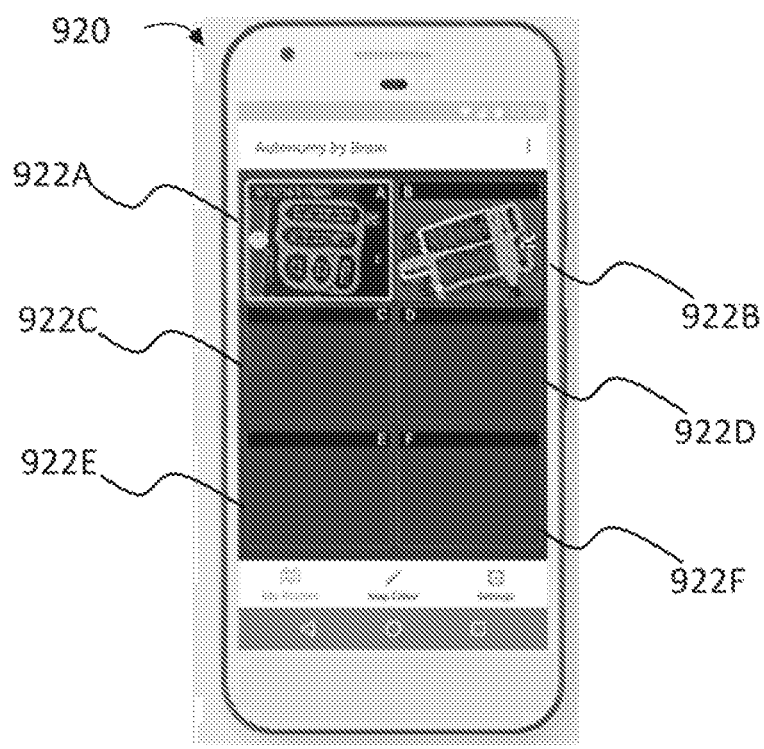
FIG. 9C-9E are user interfaces for correcting maps in accordance to implementations of this disclosure.
Figure 9D:
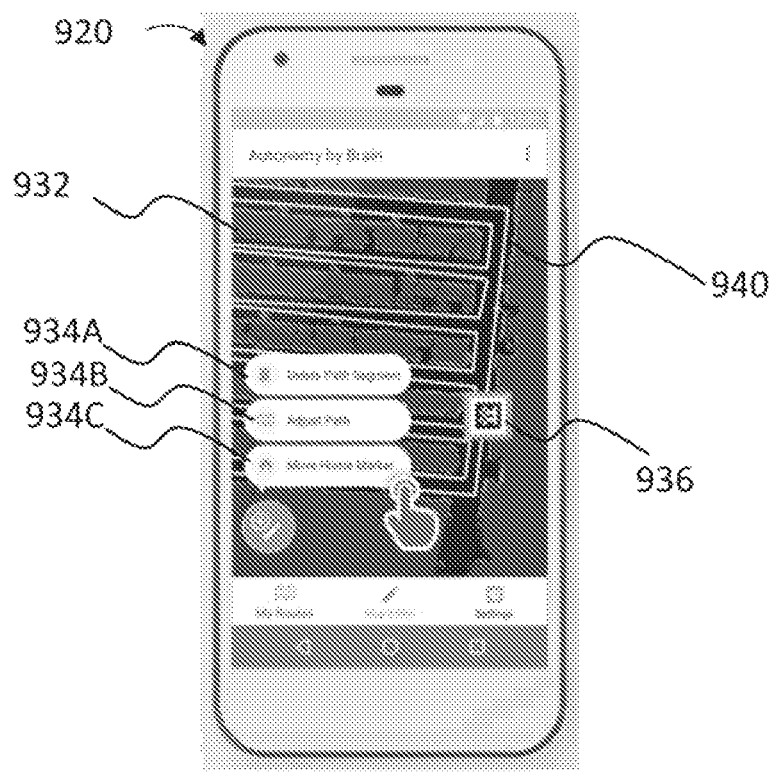
Figure 9E:
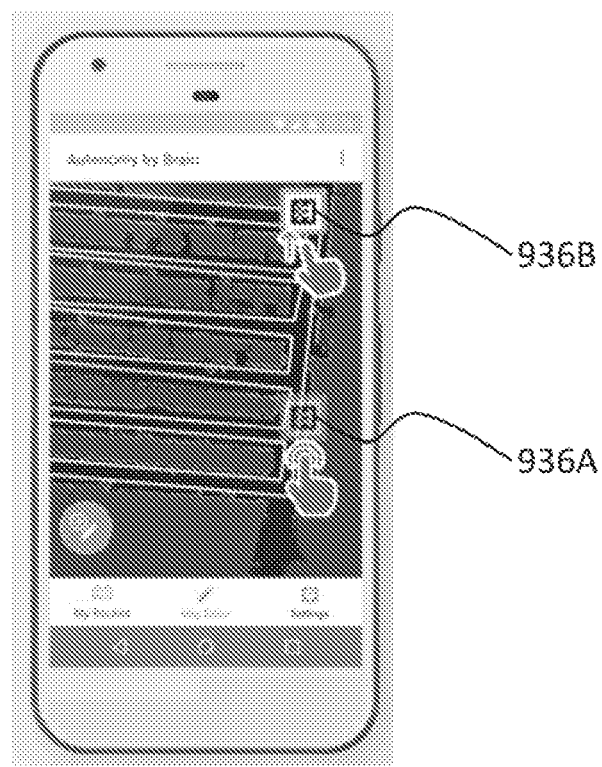

By way of illustration, FIG. 9C-9E are user interfaces for correcting maps in accordance to implementations of this disclosure. For example, FIG. 9C shows a user interface for selecting a map to correct in accordance to some implementations of this disclosure. Device 920 can be a user interface, such as a user interface included in user interface unit 218 and/or access points 304A and 304B. By way of illustration, device 920 is illustrated as a mobile phone; however, other interfaces are contemplated, such as any of those described with reference to user interface unit 218 and/or access points 304A and 304B. On device 920, there can be a plurality of cells displayed (e.g., cells 922A-922F), the cells showing maps that can be selected by a user. FIG. 9C only shows six cells, but there can be fewer or more cells displayed as desired. As illustrated, some cells are empty (e.g., cells 922C-922F) and some cells have maps (e.g., cells 922A and 922B). Cells 922A and 922B contain maps that have been run, indicating the high-level map of where robot 200 had previously travelled in an environment.

After selecting a cell with a map, options can appear for editing the map. FIG. 9D illustrates various manipulations of a map that can be performed by a user in accordance to implementations of this disclosure. For example, device 920 can display a map 932 with path portions 940. A user can pick from a displayed menu including items. There can be any number of options that a user can select, relating to any manipulation of the map that a user can perform. For example, the interface can allow a user to edit a map, adjust a path, move a starting position (e.g., home marker), delete path/path segment, add operations (e.g., cleaning, manipulating, actuating, etc.), and/or any other manipulation a user could desire. For example, option 934A can allow a user to delete a path segment. For example, after selecting option 934A, a user can then select a portion of a path displayed in map 932 and/or path portions 940. Robot 200 can then delete such selected path portion. As another example, option 934B can allow a user to adjust a path. For example, a user can select a path portion included in map 932 and/or path portions 940 and move/manipulate that path portion. As another example, option 934C can allow a user to move a home marker (e.g., a starting position). For example, the starting position can be where robot 200 begins and/or ends a robotic operation. For example, a robot can begin navigating a space starting at a home marker and/or end when it comes back to the home marker. Icon 936 can indicate where the home marker location is. FIG. 9E illustrates an operation of moving a home marker in accordance to some implementations of this disclosure. For example, the home marker can be moved from location 936A to location 936B.

Advantageously, user correction can allow robot 200 to adjust directly based on user feedback. Such feedback can aid robot 200 in path planning as the user's feedback can be indicative of the desired path for robot 200. Accordingly, robot 200 can more favorably weigh paths that are in accordance with the feedback.

As another example, a performance measure can be stored in memory 202. The performance measure can reflect, at least in part, how well robot 200 performed. In some cases, the performance measure can be a parameter. The parameter can be a measure of how closely robot 200 meets a target trajectory and/or path/path portion. A person having ordinary skill in the art would appreciate that there can be any number of ways this comparison can be measured numerically, such as percentages, differences, etc. In some cases, it is the relative value (e.g., between runs of a robot) of the parameter that can be reflective of how well robot 200 is performing. As another example, the parameter can measure how many locations associated with the desirable pixels in the cost map robot 200 traverses. Where robot 200 navigates (e.g., floor cleaner, transporter, and/or other navigating robots), the performance parameter can be indicative at least in part of the floor area (e.g., square meters, square footage, square inches) of which robot 200 travels. As another example, the parameter can measure the percentage out of the ideal path (the most valuable in terms of the cost map) that robot 200 achieves in the path/path portion selected. Based at least in part on the performance measure, robot 200 can alter actions to improve performance.

The performance characteristic can be attributed to a subset (e.g., a choice of robot 200 in one given instance and/or a plurality of choices of robot 200). Accordingly, robot 200 can optimize behavior at an instance and/or a plurality of instances, thereby further optimizing behavior. Similarly, robot 200 can observe how it optimized behavior in one context and perform a substantially similar behavior in subsequent occurrences of the context.

Returning to FIG. 4, block 412 can include determining actuator commands for the first path portions. The actuator commands can allow robot 200 to travel along the path portion, such as in accordance to one or more control characteristics. Moreover, in some implementations, the actuator commands can allow robot to perform an operational task, such as turning a brush, spraying water, moving objects (and/or people and animals), articulating, and/or any other function of robot 200.

Moreover, in some implementations, an actuator command function can be used. The actuator command function can take into account various transitory factors of robot 200, allowing for robot 200 to behave appropriately. Indeed, where the transitory factors influence robot 200 enough, the transitory factors can be taken into account in block 410.

For example, the physics of movements of robot 200 can alter when, for example, robot 200 changes weight. By way of illustration, the weight of robot 200 can change when fluid levels change (e.g., water, cleaning solution, fuel, etc.) and/or robot takes on/delivers cargo and/or people. Accordingly, when robot 200 changes weight, the physics of turns change.

As another example, actuators relating to a robotic task of robot 200 can impact the physics of the movement of robot 200. For example, where robot 200 has a rotating brush (e.g., as a burnisher, scrubber, and/or other floor cleaner), the rotation of the brush can create moments on robot 200, which can impact how robot 200 can turn and/or change directions.

In some cases, the actuator commands can take the form of adjusting actuators in accordance to control characteristics identified for robot 200 to travel along the first path portion. For example, robot 200 can generate an actuator command to effectuate the first control characteristic of a string of control characteristics of the first path portion (e.g., taking the control characteristic corresponding to the first arrow of trajectory 726, and/or any other trajectory, path, and/or path portion). In some cases, this first control characteristic can be the only control characteristic effectuated, wherein robot 200 then reassesses the path (e.g., finds another first path portion in accordance to method 400) after sending the actuator command comprising the first control characteristic. Advantageously, this can allow robot 200 to reassess the path after each move, giving greater potential for optimal path planning. In some cases, the first control characteristic can be a model predictive control. By way of illustration, the first control characteristic can correspond to a first wheel angle, first army position, and/or any other control characteristic described in this disclosure.

However, in some cases, the actuator command(s) can include a plurality of control characteristics. For example, the plurality of control characteristics can relate at least in part to control characteristics of the first path portion. By effectuating the control characteristics, robot 200 can travel at least a portion of the first path portion. For example, two, three, four, five, or more control characteristics can be used in relation to the actuator command(s). By way of illustration, such control characteristics can relate to two, three, four, five, or more of the arrows of trajectory 626. Advantageously, using such a plurality can allow for smoother travelling and/or consumption of less computational resources. The smoother travel can allow the robot to have a more natural appearance as it moves.

In some implementations, user interface 218 can include an external start button that, when engaged, causes robot 200 to perform one or more steps of method 400. For example, the external start button can repeat at least blocks 404, 406, 408, 410, and 412, allowing for robot 200 to reassess a situation. Advantageously, errors, noise, and/or any other issues in sensor data can cause robot 200 to mistakenly detect objects and/or obstacles that are not there. The external button can trigger robot 200 to reassess and/or clear problematic data, thereby running route planning again. In some cases, this can allow robot 200 to appropriately navigate a space that it had issues navigating.

Figure 10:
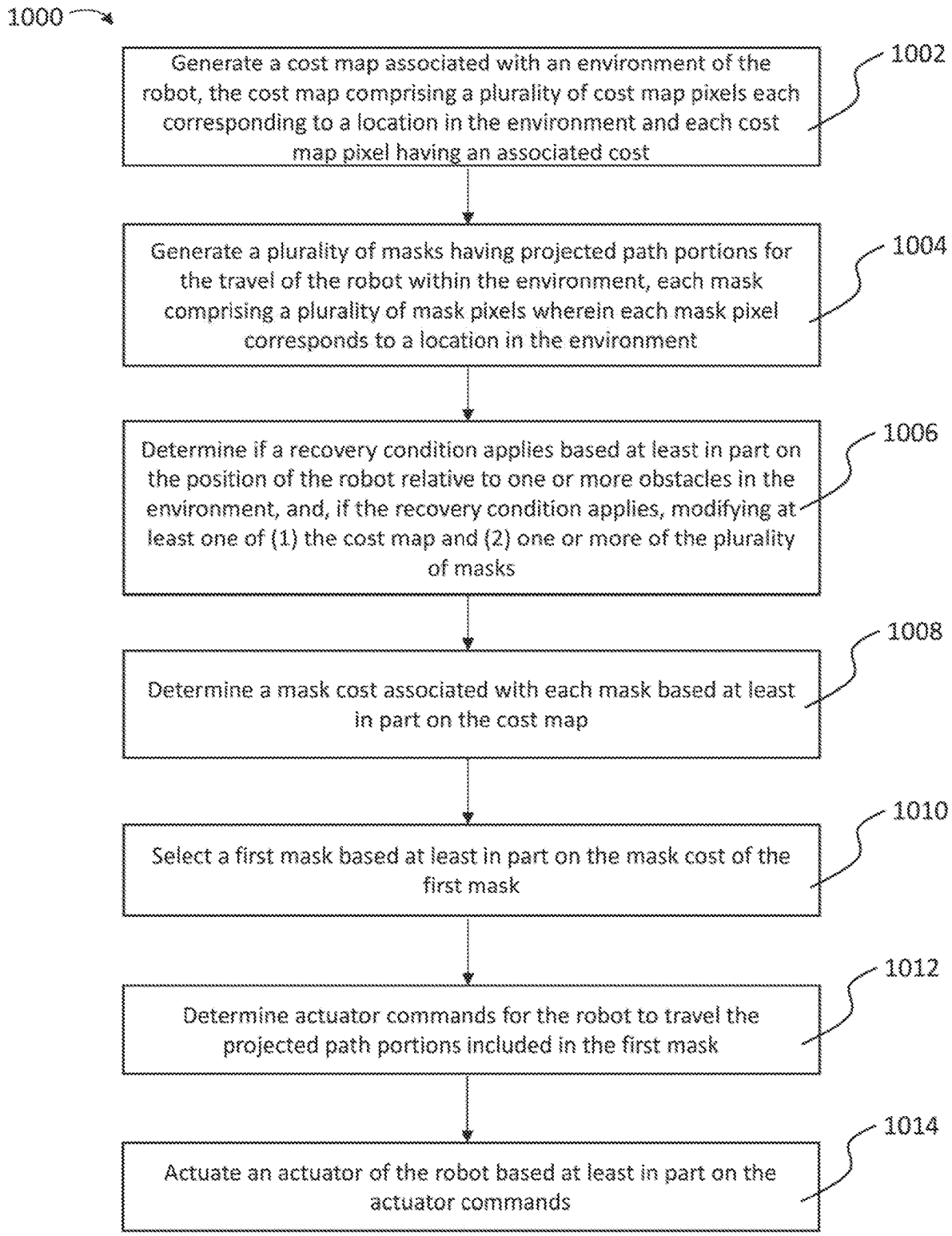
FIG. 10 is a process flow diagram of an exemplary method for path planning in accordance with some implementations of this disclosure.

FIG. 10 is a process flow diagram of an exemplary method 1000 for path planning in accordance with some implementations of this disclosure. Block 1002 includes Generating a cost map associated with an environment of the robot, the cost map comprising a plurality of cost map pixels each corresponding to a location in the environment and each cost map pixel having an associated cost. Block 1004 includes generating a plurality of masks having projected path portions for the travel of the robot within the environment, each mask comprising a plurality of mask pixels wherein each mask pixel corresponds to a location in the environment. Block 1006 includes determining if a recovery condition applies based at least in part on the position of the robot relative to one or more obstacles in the environment, and, if the recovery condition applies, modifying at least one of (1) the cost map and (2) one or more of the plurality of masks. Block 1008 includes determining a mask cost associated with each mask based at least in part on the cost map. Block 1010 includes selecting a first mask based at least in part on the mask cost of the first mask. Block 1012 includes determining actuator commands for the robot to travel the projected path portions included in the first mask. Block 1014 includes actuating an actuator of the robot based at least in part on the actuator commands.

Figure 11:
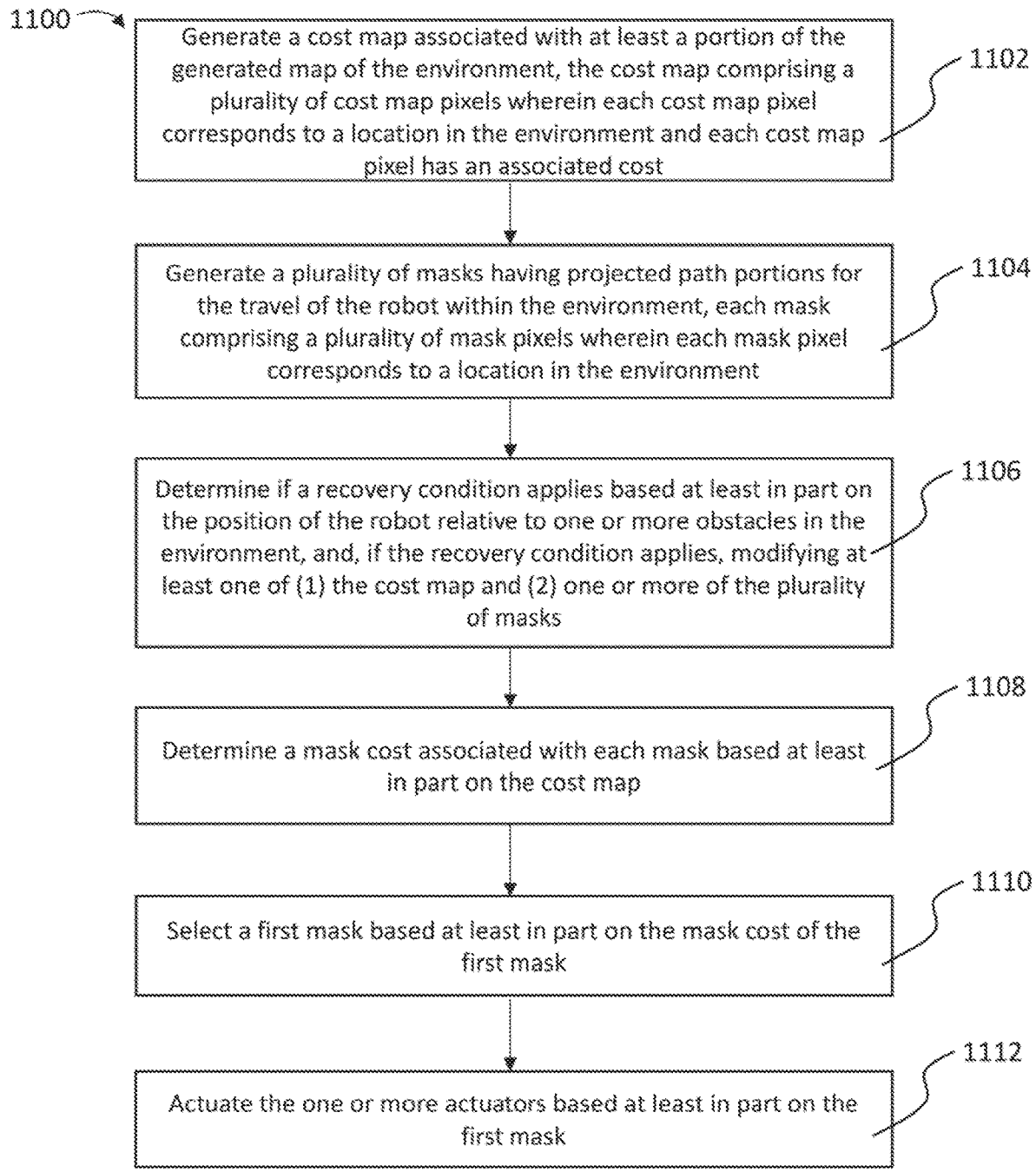
FIG. 11 is a process flow diagram of an exemplary method for path planning in accordance with some implementations of this disclosure.

FIG. 11 is a process flow diagram of an exemplary method 1100 for path planning in accordance with some implementations of this disclosure. Block 1102 includes generating a cost map associated with at least a portion of the generated map of the environment, the cost map comprising a plurality of cost map pixels wherein each cost map pixel corresponds to a location in the environment and each cost map pixel has an associated cost. Block 1104 includes generating a plurality of masks having projected path portions for the travel of the robot within the environment, each mask comprising a plurality of mask pixels wherein each mask pixel corresponds to a location in the environment. Block 1106 includes determining if a recovery condition applies based at least in part on the position of the robot relative to one or more obstacles in the environment, and, if the recovery condition applies, modifying at least one of (1) the cost map and (2) one or more of the plurality of masks. Block 1108 includes determining a mask cost associated with each mask based at least in part on the cost map. Block 1110 includes selecting a first mask based at least in part on the mask cost of the first mask. Block 1112 includes actuating the one or more actuators based at least in part on the first mask.

Figure 12:
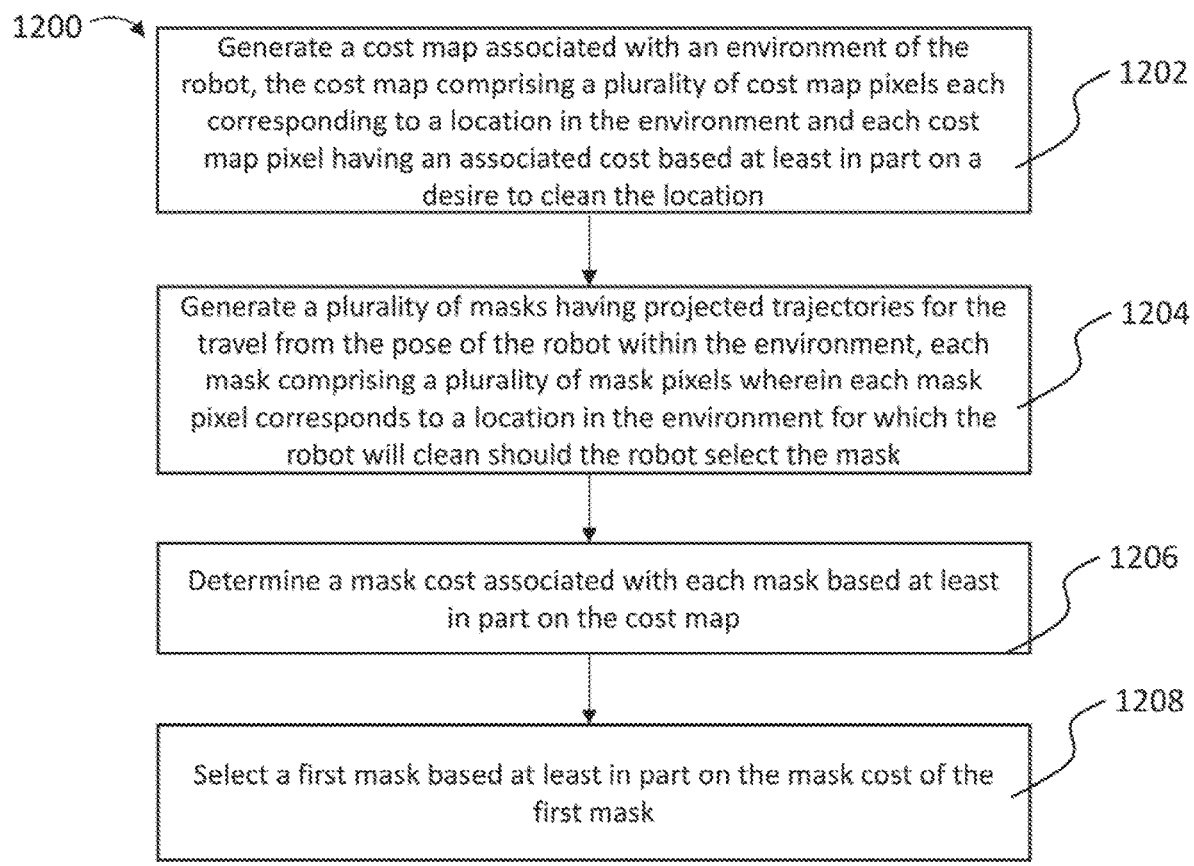
FIG. 12 is a process flow diagram of an exemplary method for path planning in accordance with some implementations of this disclosure.

FIG. 12 is a process flow diagram of an exemplary method 1200 for path planning in accordance with some implementations of this disclosure. Block 1202 includes generating a cost map associated with an environment of the robot, the cost map comprising a plurality of cost map pixels each corresponding to a location in the environment and each cost map pixel having an associated cost based at least in part on a desire to clean the location. Block 1204 includes generating a plurality of masks having projected trajectories for the travel from the pose of the robot within the environment, each mask comprising a plurality of mask pixels wherein each mask pixel corresponds to a location in the environment for which the robot will clean should the robot select the mask. Block 1206 includes determining a mask cost associated with each mask based at least in part on the cost map. Block 1208 includes selecting a first mask based at least in part on the mask cost of the first mask.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software can be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and can be modified as required by the particular application. Certain steps can be rendered unnecessary or optional under certain circumstances. Additionally, certain steps or functionality can be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated can be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that can be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A method for determining a trajectory for a robot, comprising:
generating a cost map for a computer readable map corresponding to an environment, the cost map comprising a cost function as a function of space within the environment, the cost function being proportional to a desirability for the robot to navigate over a spatial region within the environment, the cost map comprising robot centric coordinates;
receiving a matrix of predetermined masks, wherein each of a respective predetermined mask comprising robot centric coordinates and an associated actuator command for the robot;
evaluating a cost for each of the matrix of predetermined masks based on projecting the matrix of predetermined masks onto the cost map;
determining a lowest associated cost of the respective predetermined mask; and
executing the associated actuator command of the predetermined mask of lowest associated cost, execution of the associated actuator command effectuates movement of the robot along at least a portion of the trajectory.

2. The method of claim 1, further comprising:
discretizing the computer readable map into a plurality of points;
omitting points of the plurality of points associated with unnavigable region;
determining at least one controller characteristic associated with execution of at least one respective sequence of path portions along the trajectory, the controller characteristic comprising a plurality of linear velocity vectors of the robot as the robot navigates over points by executing each of the at least one sequence of path portions;
determining a shortest path to an end point of the trajectory and a shortest-path controller characteristic associated thereto; and
performing a dot product between the linear velocity vectors of the shortest-path controller characteristic and each of the mask controller characteristics to determine an associated cost, the cost being proportional to the dot product.

3. The method of claim 2, further comprising:
projecting a footprint of the robot at points of the plurality of points close to the unnavigable regions; and
omitting points of the plurality of points where the footprint of the robot comprises a portion of the unnavigable regions, the footprint comprising a spatial region greater than or equal to a spatial region occupied by the robot.

4. The method of claim 1, further comprising:
imposing artificial regions of high cost on the cost map at predetermined distances from the trajectory.

5. The method of claim 1, further comprising:
omit one or more of the predetermined mask if a recovery condition applies based on no predetermined mask comprises an associated cost below a threshold.

6. The method of claim 1, wherein,
the projection of the predetermined masks on the cost map comprises a dot product between the matrix of predetermined masks and the cost map.

7. The method of claim 1, wherein,
the cost map comprises a plurality of cost pixels, wherein each cost pixel comprises an associated cost thereto, and each cost pixel corresponds to a spatial region within the environment.

8. A robotic system, comprising:
a non-transitory computer readable storage medium comprising a plurality of instructions stored thereon; and
one or more processors, coupled to a robot, configured to execute the instructions to:
generate a cost map for a computer readable map corresponding to an environment, the cost map comprising a cost function as a function of space within the environment, the cost function being proportional to a desirability for the robot to navigate over a spatial region within the environment, the cost map comprising robot centric coordinates;
receive a matrix of predetermined masks, wherein each of a respective predetermined mask comprising robot centric coordinates and an associated actuator command for the robot;
evaluate a cost for each of the matrix of predetermined masks based on projecting the matrix of predetermined masks onto the cost map;
determine a lowest associated cost of the respective predetermined mask; and
execute the associated actuator command of the predetermined mask of lowest associated cost, execution of the associated actuator command effectuates movement of the robot along at least a portion of the trajectory.

9. The robotic system claim 8, wherein the one or more processors further executes the instructions to:
discretize the computer readable map into a plurality of points;
omit points of the plurality of points associated with unnavigable region;
determine at least one controller characteristic associated with execution of at least one respective sequence of path portions along the trajectory, the controller characteristic comprising a plurality of linear velocity vectors of the robot as the robot navigates over points by executing each of the at least one sequence of path portions;
determine a shortest path to an end point of the trajectory and a shortest-path controller characteristic associated thereto; and
perform a dot product between the linear velocity vectors of the shortest-path controller characteristic and each of the mask controller characteristics to determine an associated cost, the cost being proportional to the dot product.

10. The robotic system claim 9, wherein the one or more processors further executes the instructions to:
project a footprint of the robot at points of the plurality of points close to the unnavigable regions; and
omit points of the plurality of points where the footprint of the robot comprises a portion of the unnavigable regions, the footprint comprising a spatial region greater than or equal to a spatial region occupied by the robot.

11. The robotic system claim 8, wherein the one or more processors further executes the instructions to:
impose artificial regions of high cost on the cost map at predetermined distances from the trajectory.

12. The robotic system claim 8, wherein the one or more processors further executes the instructions to:

omit one or more of the predetermined mask if a recovery condition applies based on no predetermined mask comprises an associated cost below a threshold.

13. The robotic system of claim 8, wherein,
the projection of the predetermined masks on the cost map comprises a dot product between the matrix of predetermined masks and the cost map.

14. The robotic system of claim 8, wherein,
the cost map comprises a plurality of cost pixels, wherein each cost pixel comprises an associated cost thereto, and each cost pixel corresponds to a spatial region within the environment.

15. A non-transitory computer readable storage medium comprising a plurality of instructions stored thereon that, when executed by a processor, configure the processor to:
generate a cost map for a computer readable map corresponding to an environment, the cost map comprising a cost function as a function of space within the environment, the cost function being proportional to a desirability for the robot to navigate over a spatial region within the environment, the cost map comprising robot centric coordinates;
receive a matrix of predetermined masks, wherein each of a respective predetermined mask comprising robot centric coordinates and an associated actuator command for the robot;
evaluate a cost for each of the matrix of predetermined masks based on projecting the matrix of predetermined masks onto the cost map;
determine a lowest associated cost of the respective predetermined mask; and
execute the associated actuator command of the predetermined mask of lowest associated cost, execution of the associated actuator command effectuates movement of the robot along at least a portion of the trajectory.

16. The non-transitory computer readable storage medium of claim 15, wherein the processor is further configured to execute the instructions to:
discretize the computer readable map into a plurality of points;
omit points of the plurality of points associated with unnavigable region;
determine at least one controller characteristic associated with execution of at least one respective sequence of path portions along the trajectory, the controller characteristic comprising a plurality of linear velocity vectors of the robot as the robot navigates over points by executing each of the at least one sequence of path portions;
determine a shortest path to an end point of the trajectory and a shortest-path controller characteristic associated thereto; and
perform a dot product between the linear velocity vectors of the shortest-path controller characteristic and each of the mask controller characteristics to determine an associated cost, the cost being proportional to the dot product.

17. The non-transitory computer readable storage medium of claim 16, wherein the processor is further configured to execute the instructions to:
project a footprint of the robot at points of the plurality of points close to the unnavigable regions; and
omit points of the plurality of points where the footprint of the robot comprises a portion of the unnavigable regions, the footprint comprising a spatial region greater than or equal to a spatial region occupied by the robot.

18. The non-transitory computer readable storage medium of claim 15, wherein the instructions further configure the processor to:
impose skirts, or artificial regions of high cost, on the cost map at predetermined distances from the trajectory.

19. The robotic system claim 15, wherein the processor is further configured to execute the instructions to:
imposing artificial regions of high cost on the cost map at predetermined distances from the trajectory.

20. The robotic system of claim 15, wherein,
the cost map comprises a plurality of cost pixels, wherein each cost pixel comprises an associated cost thereto, and each cost pixel corresponds to a spatial region within the environment.

\* \* \* \* \*